(12) United States Patent
Suarez Gracia et al.

(10) Patent No.: US 9,632,569 B2
(45) Date of Patent: Apr. 25, 2017

(54) DIRECTED EVENT SIGNALING FOR MULTIPROCESSOR SYSTEMS

(71) Applicant: QUALCOMM Incorporated, San Diego, CA (US)

(72) Inventors: Dario Suarez Gracia, Santa Clara, CA (US); Han Zhao, Sunnyvale, CA (US); Pablo Montesinos Ortego, Fremont, CA (US); Gheorghe Calin Cascaval, Palo Alto, CA (US); James Xenidis, Cedar Park, TX (US)

(73) Assignee: QUALCOMM Incorporated, San Diego, CA (US)

( * ) Notice: Subject to any disclaimer, the term of this patent is extended or adjusted under 35 U.S.C. 154(b) by 291 days.

(21) Appl. No.: 14/451,628

(22) Filed: Aug. 5, 2014

(65) Prior Publication Data

US 2016/0041852 A1 Feb. 11, 2016

(51) Int. Cl.
| | |
|---|---|
| *G06F 9/30* | (2006.01) |
| *G06F 1/32* | (2006.01) |
| *G06F 9/52* | (2006.01) |
| *G06F 9/48* | (2006.01) |

(52) U.S. Cl.
CPC .......... *G06F 1/3296* (2013.01); *G06F 9/4856* (2013.01); *G06F 9/4893* (2013.01); *G06F 9/526* (2013.01); *Y02B 60/144* (2013.01)

(58) Field of Classification Search
None
See application file for complete search history.

(56) References Cited

U.S. PATENT DOCUMENTS

| | | |
|---|---|---|
| 6,058,414 A | 5/2000 | Manikundalam et al. |
| 8,578,079 B2 | 11/2013 | De Cesare et al. |

(Continued)

FOREIGN PATENT DOCUMENTS

EP 2073097 A2 6/2009

OTHER PUBLICATIONS

International Search Report and Written Opinion—PCT/US2015/042026—ISA/EPO—Mar. 1, 2016.

(Continued)

*Primary Examiner* — William B Partridge
(74) *Attorney, Agent, or Firm* — The Marbury Law Group, PLLC

(57) ABSTRACT

Multi-processor computing device methods manage resource accesses by a signaling event manager signaling processor elements requesting access to a resource to wake up to access the resource when the resource is available or wait for an event when the resource is busy. Processor elements may enter a sleep state while awaiting access to the requested resource. When multiple elements are waiting for the resource, the processor element with a highest assigned priority is signaled to wake up when the resource is available without waking other elements. Priorities may be assigned to processor elements waiting for the resource based on a heuristic or parameter that may depend on a state of the computing device or the processor elements. A sleep duration may be estimated for a processor element waiting for a resource and the processor element may be removed from a scheduling queue or assigned another thread during the sleep duration.

12 Claims, 14 Drawing Sheets

(56) References Cited

U.S. PATENT DOCUMENTS

| | | | |
|---|---|---|---|
| 2004/0143712 A1* | 7/2004 | Armstrong | G06F 9/544 711/152 |
| 2011/0161539 A1* | 6/2011 | Anand | G06F 9/526 710/200 |
| 2011/0161540 A1 | 6/2011 | Chang et al. | |
| 2013/0061005 A1 | 3/2013 | Overby et al. | |
| 2014/0040904 A1 | 2/2014 | Giusto et al. | |

OTHER PUBLICATIONS

Swaminathanv., et al., "Energy-Conscious, Deterministic I/O Device Scheduling in Hard Real-Time Systems," IEEE Transactions on Computer Aided Design of Integrated Circuits and Systems, IEEE Service Center, Piscataway, NJ, US, Jul. 1, 2003 (Jul. 1, 2003), vol. 22, No. 7, pp. 847-858, XP002522583, ISSN: 0278-0070, DOI: 10.1109/TCAD.2003.814245 [retrieved on Jul. 1, 2003].

Mueller F: "Prioritized token-based mutual exclusion for distributed systems", Parallel and Distributed Real-Time Systems, 1997. Proceedings of The Joint Workshop on Geneva, Switzerland Apr. 1-3, 1997, Los Alamitos, CA, USA, IEEE Comput. SOC, US (Apr. 1, 1997), pp. 72-80, XP010258193. DOI: 10.1109/WPDRTS.1997.637866 ISBN: 978-0-8186-8096-0 abstract Section 1. Introduction; p. 72 p. 73, right-hand column. line 2-11 p. 75, right-hand column, line 8-21 p. 76, right-hand column. 19; figure 6.

Partial International Search Report—PCT/US2015/042026—ISA/EPO—Nov. 10, 2015.

Suleman M.A., et al., "Accelerating Critical Section Execution with Asymmetric Multi-Core Architectures," Mar. 7, 2009 (Mar. 7, 2009), Proceedings of the 14th ACM International Conference on Architectural Support for Programming Languages and Operating Systems (ASPLOS), Washington, DC, Mar. 2009, pp. 1-12, XP007908331.

Jiang J R: "A prioritized h-out of-k mutual exclusion algorithm with maximum degree of concurrency for mobile ad hoc networks and distributed systems", Parallel & Distributed Computing, Applications & Technologies, 2003. PDCAT' 2003. Proceedings of the Fourth International Conference on Aug. 27-29, 2003, Piscataway, NJ, IEEE, (Aug. 27, 2003), pp. 329-334.

Brandenburg B.B., "Scheduling and Locking in Multiprocessor Real-Time Operating Systems," Chapel Hill, dissertation submitted for the year of 2011, pp. 1-614.

* cited by examiner

| Processor Element | Priority | Element Temperature | Number of Element Wake Ups | Time Since Last Element Wake Up |
|---|---|---|---|---|
| Processor Element 0 | 3 | 31.9°C | 253 | 5.2ms |
| Processor Element 1 | 5 | 35.6°C | 425 | 3.6ms |
| Processor Element 2 | 1 | 28.1°C | 356 | 10.1ms |
| Processor Element 3 | 8 | 38.2°C | 227 | 1.7ms |
| ... | ... | ... | ... | ... |
| Processor Element N-1 | 2 | 31.4°C | 314 | 8.8ms |

FIG. 4

DIRECTED EVENT SIGNALING FOR MULTIPROCESSOR SYSTEMS

BACKGROUND

Multicore processors rely on atomicity to guarantee correctness of parallel applications. To prevent other processes from interrupting the execution of atomic operations, one implemented solution is for the processes to obtain locks on the resources needed to execute the critical section in mutual-exclusion so that other processes are prevented from using the same resources until the resources are released from the locks. An example of one such lock is a spinlock. A spinlock is an atomic operation that actively waits until the lock is acquired, repeatedly checking whether the lock is available. Since the spinlock process remains active but is not performing a useful task, this active wait operation consumes energy because the processor is continuously loading the lock from memory. Other locks, or other resource acquisition schemes, may similarly be associated with some cost to the efficiency and performance of the implementing device. To save energy, some processor architectures have instructions to wait for events and to signal events (e.g., ARM wait-for-event ("WFE")/set event ("SEV")). These architectures employ these instructions in an indiscriminate manner, where the instructions are broadcast to all waiting processor cores and create a race condition between the processor cores to claim an available lock for executing the critical sections.

When signaling a processor core with a wake up instruction to execute an atomic process, some operating systems, such as Linux, reorder the wake up in software to avoid cache ping-pong issues. In these instances operating system level handling may require kernel activity and context switches. This may result in reduced performance and increased resource usage in an architecture employing the above described indiscriminant instruction signaling in which multiple processor cores would be signaled to wake up to obtain an available lock when only one core will be able to use the resource.

SUMMARY

The methods and apparatuses of various embodiments provide circuits and methods for directed event signaling for multiprocessor systems. Embodiment methods may include signaling a processor element requesting access to a resource to wait for an event in response to determining that the resource is not available, and signaling the processor element to access the resource in response to the resource becoming available. Embodiments may include assigning a priority to the processor element for accessing the resource in response to the resource's availability, receiving a signal indicating availability of the resource, and identifying one of the plurality of processor elements that is assigned a highest priority for accessing the resource in response to the signal indicating availability of the resource, in which signaling the processor element to access the resource in response to the resource becoming available may include signaling the processor element that is assigned the highest priority for accessing the resource to access the resource in response to the resource becoming available. In an embodiment, signaling a processor element requesting access to a resource to wait for an event in response to determining that the resource is not available may include triggering the processor element to enter a sleep state, and signaling the processor element to access the resource in response to the resource becoming available may include signaling the processor element to wake up.

In an embodiment assigning a priority to the processor element for accessing the resource may include receiving a parameter for use in calculating the priority of the processor element, comparing the parameter of the processor element with parameters for any of the plurality of processor elements that waiting to access the resource, determining the priority of the processor element for accessing the resource based on the comparison, and storing the determined priority of the processor element in memory. In an embodiment, receiving a parameter for use in calculating the priority of the processor element may include signaling the processor element to return the parameter for use in calculating the priority of the processor element, receiving the parameter from the processor element, and storing the parameter in memory. An embodiment method may include determining the parameter for use in calculating the priority of the processor element based on a state of the computing device, in which signaling the processor element to return the parameter for use in calculating the priority of the processor element may include signaling the processor element to return the determined parameter.

In an embodiment, receiving a parameter for use in calculating the priority of the processor element may include receiving a temperature related to the processor element. In an embodiment, receiving the parameter for use in calculating the priority of the processor element may include receiving a frequency related to the processor element. In an embodiment, receiving the parameter for use in calculating the priority of the processor element may include receiving an indication of a cache shared by the processor element with another processor element. In an embodiment, receiving the parameter for use in calculating the priority of the processor element may include receiving an indication of proximity of the processor element to another processor element.

In an embodiment assigning a priority to the processor element for accessing the resource in response to its availability may include tracking a wake up statistic for the processor element, determining whether the wake up statistic for the processor element exceeds wake up threshold, and assigning a high priority to the processor element for accessing the resource in response to determining that the wake up statistic for the processor element exceeds the wake up threshold.

An embodiment method may include sending the priority assigned to the processor element to another processor element currently accessing the resource, and in which signaling the processor element to access the resource in response to the resource becoming available may include signaling the processor element by the another processor element currently accessing the resource upon releasing the resource. An embodiment method may include detecting a plurality of threads requesting access to the resource, and requesting an operating system to migrate the plurality of threads to a selected group of the plurality of processor elements.

An embodiment method may include estimating a sleep time for the processor element while waiting for the resource, determining a sleep state for the processor element based on the estimated sleep time, and notifying the processor element of the sleep state to implement while waiting for the resource. An embodiment method may include estimating a sleep time for the processor element while waiting for the resource, and notifying an operating system of the computing device of the estimated sleep time for the processor element. An embodiment method may include removing the processor element from a scheduling queue for a period of time associated with the estimated sleep time for the processor element. An embodiment method may include assigning a thread to the processor element during the estimated sleep time. An embodiment method may include communicating between signaling event managers to manage signaling of the plurality of processor elements An embodiment includes a computing device having a plurality of processor elements and a signaling event manager communicatively connected to each other, and the signaling event manager configured with signaling event manager-executable instructions to perform operations of one or more of the embodiment methods described above.

An embodiment includes a non-transitory processor-readable medium having stored thereon processor-executable software instructions to cause a processor to perform operations of one or more of the embodiment methods described above.

An embodiment includes a computing device having means for performing functions of one or more of the embodiment methods described above.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

FIG. 4 is an example table illustrating a relationship between processor elements and their assigned priorities in accordance with an embodiment.

DETAILED DESCRIPTION

Figure 1:
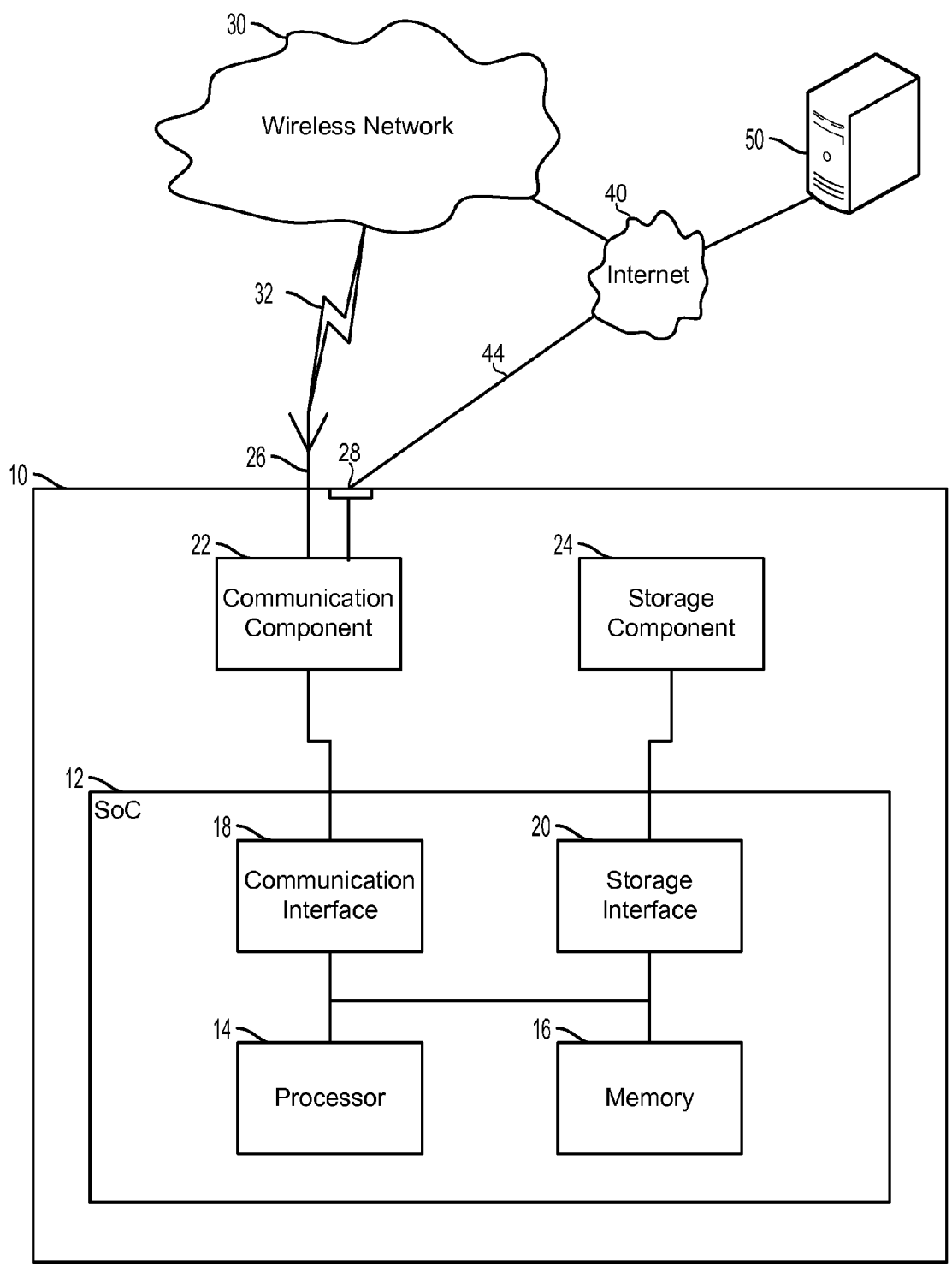
FIG. 1 is a component block diagram illustrating a computing device suitable for implementing an embodiment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The terms "computing device" and "mobile computing device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices that include a memory, and a programmable multi-processor (e.g. multi-core, multi-socket, or multi-CPU). While the various embodiments are particularly useful for mobile computing devices, such as smartphones, which have limited memory and battery resources, the embodiments are generally useful in any electronic device that implements a plurality of memory devices and a limited power budget in which reducing the power consumption of the processors can extend the battery-operating time of the mobile computing device.

The term "system-on-chip" (SoC) is used herein to refer to a set of interconnected electronic circuits typically, but not exclusively, including a hardware core, a memory, and a communication interface. A hardware core may include a variety of different types of processor elements, such as a general purpose processor, a central processing unit (CPU), a digital signal processor (DSP), a graphics processing unit (GPU), an accelerated processing unit (APU), an auxiliary processor, a single-core processor, a multi-core processor, and individual processor cores. A hardware core may further embody other hardware and hardware combinations, such as a field programmable gate array (FPGA), an application-specific integrated circuit (ASCI), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

Embodiments include methods and computing devices implementing such methods for dynamically changing the time at which each processor element in a multi-processor element system receives a signal by using system state information. A signaling event manager may be implemented in hardware and/or software for managing the event and wake up signaling to each of the processor elements by ordering events based on system and environment states. One or more signaling event managers may compute heuristic-based notification priorities and send notifications of events (e.g., wake up and wait signals) to individual processor elements in an order determined by the priorities determined from a heuristic. The heuristic for determining processor element priorities that is applied in response to a particular signaling event may be selected based on the signaling event, and may be supplied to the signaling event manager by being directly encoded in a received signaling event instruction, read from a register or memory location associated with the signaling event, or predefined and stored in the signaling event manager for different signaling modes or events. In an embodiment, a heuristic may be used to determine the order of a signaling priority for the processor elements based on temperatures of the processer elements (from low to high) to reduce the chance of thermal throttling. In an embodiment, the heuristic may be based on operating frequency of the elements (from high to low) to minimize execution time. In an embodiment, the heuristic may be based on sharing cache, or other resources, such as accelerators or functional units, between certain processor elements and proximity of the processor elements (preferring a local processor element than a remote processor element).

Using one or more of the embodiment heuristics for determining the priority of the processor elements, the signaling event manager may create and manage a list of processor elements and their priorities. The list may be used to send out event notifications to the processor elements signaling to one of the processor elements (vs. all processor cores as in the prior art) the availability of a resource and to accept/verify requests for a resource from all processor elements. The list may be managed such that the priority of the processor elements may be rearranged based on the heuristic factors described above.

In an embodiment, when a processor element receives an event, the processor element may wake up and try to grab a lock. The signaling event manager may receive a request from the processor element to grab a lock for a resource and identify the priority of the processor element. If a lock is available and the processor element has the highest priority, the signaling event manager may allow the processor element to obtain the available lock. However, if locks on the resource are unavailable or the processor element does not have the highest priority, the signaling event manager may instruct the processor element to wait. Upon a lock becoming available and the signaling event manager identifying a highest priority processor element, the signaling event manager may signal the highest priority processor element to wake up and request to obtain the lock. When a processor element releases a lock and the lock becomes available, the signaling event manager may send a signal to a next waiting processor element according to a previous priority ordering of the processor elements, or the signaling event manager may update the list of waiting processor elements and send the signal to a new highest priority waiting processor element.

The heuristic used by the signaling event manager to determine the priorities of the processor elements may be provided by the processor elements. In an embodiment, the processor elements may include a wait-for-event ("WFE") instruction that may be executed when requesting a resource lock. The wait-for-event instruction may list the heuristic information that is desired for determining the priority of the processor elements. Executing the wait-for-event instruction may cause the processor elements to forward the heuristic information along with the request for the resource lock. For example, the processor element may return thermal information in response to an indication of a thermal-based heuristic, cache locality information in response to an indication of a location-based heuristic, power state information in response to an indication of a frequency-based heuristic. A processor element may provide one or more of these information types to the signaling event manager in the request to grab the lock. The heuristic information type sent may be predetermined by a type of system implementing the signaling event manager. In an embodiment, the signaling event manager may respond to the request for the resource lock and heuristic information with a WFE signal, which may trigger the receiving processor element to enter a sleep/low power state.

In an embodiment in which the processor elements do not include a WFE instruction and the heuristic information type is indicated by the signaling event manager-selected or in which the signaling event manager changes the heuristic information that it requires to determine priority, the type of heuristic information requested may be included in the WFE signal sent to the processor elements. Bits in the WFE signal may prompt the processor element to respond to the signaling event manager with state information relevant to a heuristic so that the signaling event manager may apply that information to the heuristic in order to determine the priority of the processor element. As above, examples may include the processor element returning one or more of thermal information in response to an indication of a thermal-based heuristic, cache locality information in response to an indication of a location-based heuristic, power state information in response to an indication of a frequency-based heuristic in response to an indication of a signaling event manager-selected heuristic. The wait-for-event signal may also trigger the sleep state in the requesting processor elements.

In an embodiment, the heuristic information for the requesting processor elements may be determined, rather than retrieved, by the signaling event manager in response to resource lock requests. The signaling event manager may still send the wait-for-event signal to the requesting processor elements to trigger the sleep state in the requesting processor elements.

The signaling event manager may keep track of the number of wake ups and/or when the wake ups last occurred for each processor element. The signaling event manager may compare this data to a starvation threshold to prioritize processor elements so that all processor elements eventually receive the lock. For example, when a processor element exceeds the threshold indicating that the processor element is receiving a skewed number of locks (high or low), the signaling event manager may adjust the priorities of the processor elements to balance the number of locks obtained by the various processor elements to prompt forward progress of the waiting processes.

The various embodiments may be useful for any synchronization primitive when multiple participants attempt to access the resources of the computing device and there is a potential for contention for accessing the resources. For ease of explanation, the various embodiments are described with reference to resource locks, however such descriptions are not meant to be limiting.

FIG. 1 illustrates a system including a computing device 10 in communication with a remote computing device 50 suitable for use with the various embodiments. The computing device 10 may include an SoC 12 with a processor 14, a memory 16, a communication interface 18, and a storage interface 20. The computing device may further include a communication component 22 such as a wired or wireless modem, a storage component 24, an antenna 26 for establishing a wireless connection 32 to a wireless network 30, and/or the network interface 28 for connecting to a wired connection 44 to the Internet 40. The processor 14 may include any of a variety of processor elements, including a number of processor cores. The SoC 12 may include one or more processors 14. The computing device 10 may include more than one SoC 12, thereby increasing the number of processors 14, processor elements, and processor cores. The computing device 10 may also include processor 14 that are not associated with an SoC 12. Individual processors 14 may be multi-core processors as described below with reference to FIGS. 2A and 2B. The processors 14 may each be configured for specific purposes that may be the same as or different from other processors 14 of the computing device 10. As such, various processors 14 may include various processor elements of the same or different type. One or more of the processors 14 and processor cores of the same or different configurations may be grouped together.

The memory 16 of the SoC 12 may be a volatile or non-volatile memory configured for storing data and processor-executable code for access by the processor 14. In an embodiment, the memory 16 may be configured to store data structures at least temporarily, such as intermediate processing data output by one or more of the processors 14. In an embodiment, the memory 16 may be cache memory or random access memory (RAM) configured to store information for prioritizing processor elements making lock resource access request. The memory 16 may include non-volatile read-only memory (ROM) in order to retain the information for prioritizing processor elements attempting to obtain a lock on a resource on the computing device.

The computing device 10 and/or SoC 12 may include one or more memories 16 configured for various purposes. In an embodiment, one or more memories 16 may be configured to be dedicated to storing the information for prioritizing processor elements for a designated set of processor elements. The memory 16 may store the information in a manner that enables the information to be interpreted by the signaling event manager for directed event signaling for multi-processor element systems.

The communication interface 18, communication component 22, antenna 26, and/or network interface 28, may work in unison to enable the computing device 10 to communicate over a wireless network 30 via a wireless connection 32, and/or a wired network 44 with the remote computing device 50. The wireless network 30 may be implemented using a variety of wireless communication technologies, including, for example, radio frequency spectrum used for wireless communications, to provide the computing device 10 with a connection to the Internet 40 by which it may exchange data with the remote computing device 50.

The storage interface 20 and the storage component 24 may work in unison to allow the computing device 10 to store data on a non-volatile storage medium. The storage component 24 may be configured much like an embodiment of the memory 16 in which the storage component 24 may store the information for prioritizing processor elements making lock resource access request, such that information may be accessed by one or more processors 14. The storage component 24, being non-volatile, may retain the information even after the power of the computing device 10 has been shut off. When the power is turned back on and the computing device 10 reboots, the information stored on the storage component 24 may be available to the computing device 10. The storage interface 20 may control access to the storage device 24 and allow the processor 14 to read data from and write data to the storage device 24.

Some or all of the components of the computing device 10 may be differently arranged and/or combined while still serving the necessary functions. Moreover, the computing device 10 may not be limited to one of each of the components, and multiple instances of each component may be included in various configurations of the computing device 10.

Figure 2A:
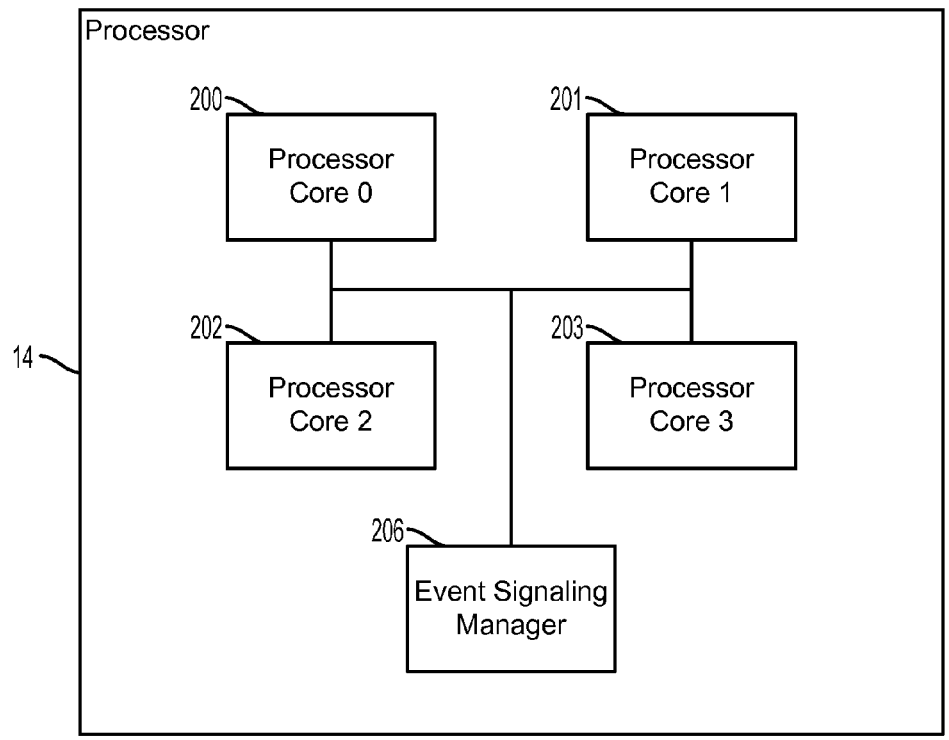
FIGS. 2A-2D are component block diagrams illustrating example multi-core processors and SoCs including at least one signaling event manager suitable for implementing an embodiment.

FIG. 2A illustrates a processor element, such as a multi-core processor 14, suitable for implementing an embodiment. The multi-core processor 14 may have a plurality of homogeneous or heterogeneous processor elements, such as processor cores 200, 201, 202, 203. The processor cores 200, 201, 202, 203 may be homogeneous in that, the processor cores 200, 201, 202, 203 of a single processor 14 may be configured for the same purpose and have the same or similar performance characteristics. For example, the processor 14 may be a general purpose processor, and the processor cores 200, 201, 202, 203 may be homogeneous general purpose processor cores. Alternatively, the processor 14 may be a graphics processing unit or a digital signal processor, and the processor cores 200, 201, 202, 203 may be homogeneous graphics processor cores or digital signal processor cores, respectively.

Through variations in the manufacturing process and materials, the performance characteristics of homogeneous processor cores 200, 201, 202, 203, may differ from processor core to processor core within the same multi-core processor 14 or within another multi-core processor 14 using the same designed processor cores.

The processor cores 200, 201, 202, 203 may be heterogeneous in that, the processor cores 200, 201, 202, 203 of a single processor 14 may be configured for different purposes and/or have different performance characteristics. Example of such heterogeneous processor cores may include what are known as "big.LITTLE" architectures in which slower, low-power processor cores may be coupled with more powerful and power-hungry processor cores.

The multi-core processor 14 may further include a signaling event manager 206 in communication with each the processor cores 200, 201, 202, 203. The signaling event manager (or the signaling manager) 206, may receive resource access requests, including requests to lock or unlock a resource of the computing device, prioritize each processor core, and signal the processor cores to wait for an event and signal prioritized processor cores when the event occurs. In an embodiment, the event includes the release of a lock on a resource for which the processor core attempts to obtain a lock.

Figure 2B:
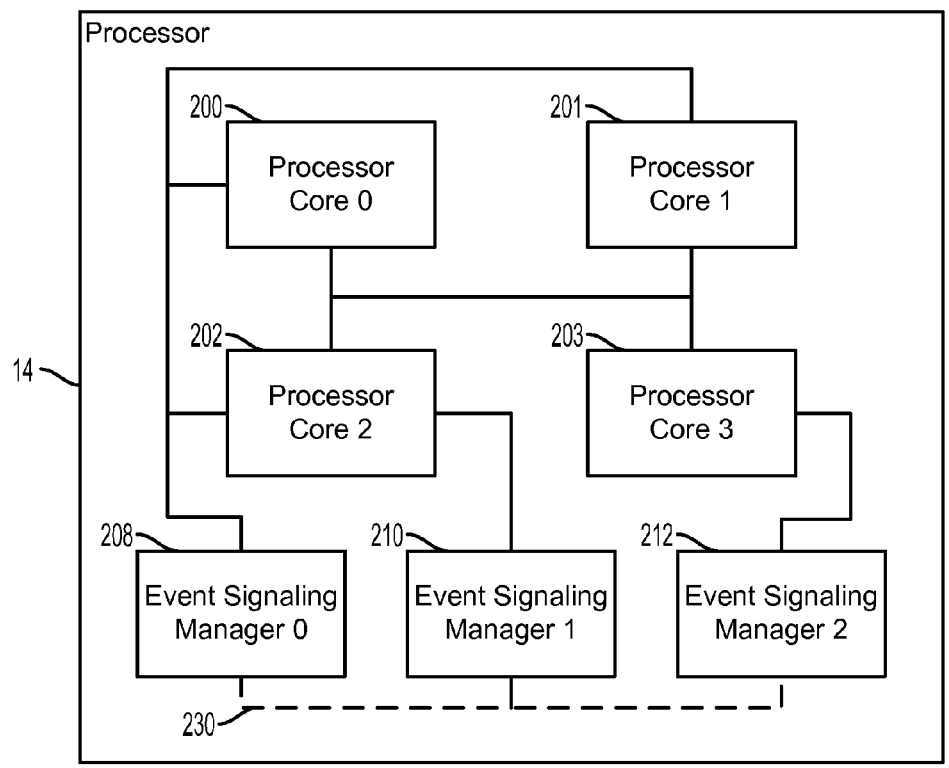

FIG. 2B illustrates a processor element suitable for implementing an embodiment much like FIG. 2A. In an embodiment, the processor element, in this instance the multi-core processor 14, may include multiple signaling event managers 208, 210, 212. In various embodiments, the signaling event managers 208, 210, 212 may be in communication with a variety of combinations or processor cores 200, 201, 202, 203. In an embodiment, multiple processor cores, like processor core 0 200, processor core 1 201, and processor core 2 202 may be in communication with a shared signaling event manager, like signaling event manager 0 208. In an embodiment, one or more processor cores, like processor core 2 202, may be in communication with multiple signaling event managers, like signaling event manager 0 208 and signaling event manager 1 210. In an embodiment, a processor core, like processor core 3 203, may be in communication with a dedicated signaling event manager, like signaling event manager 2 212. The signaling event managers 208, 210, 212 may be in communication with each other via a common communication bus of the processor element, or via a dedicated signaling event manager communication bus 230.

Figure 2C:
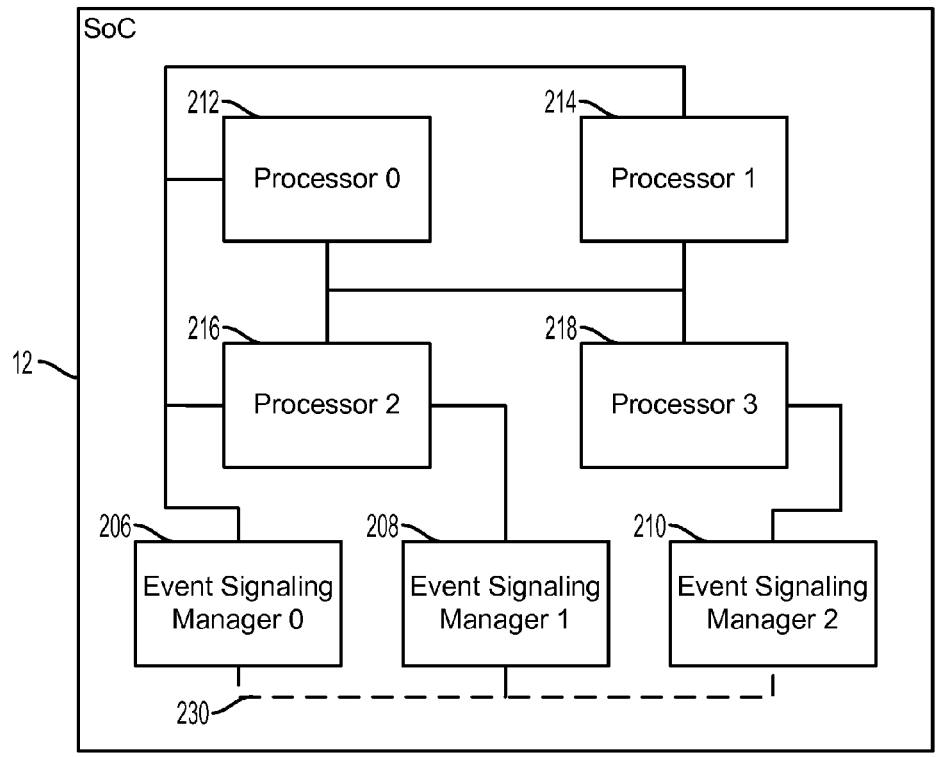
Figure 2D:
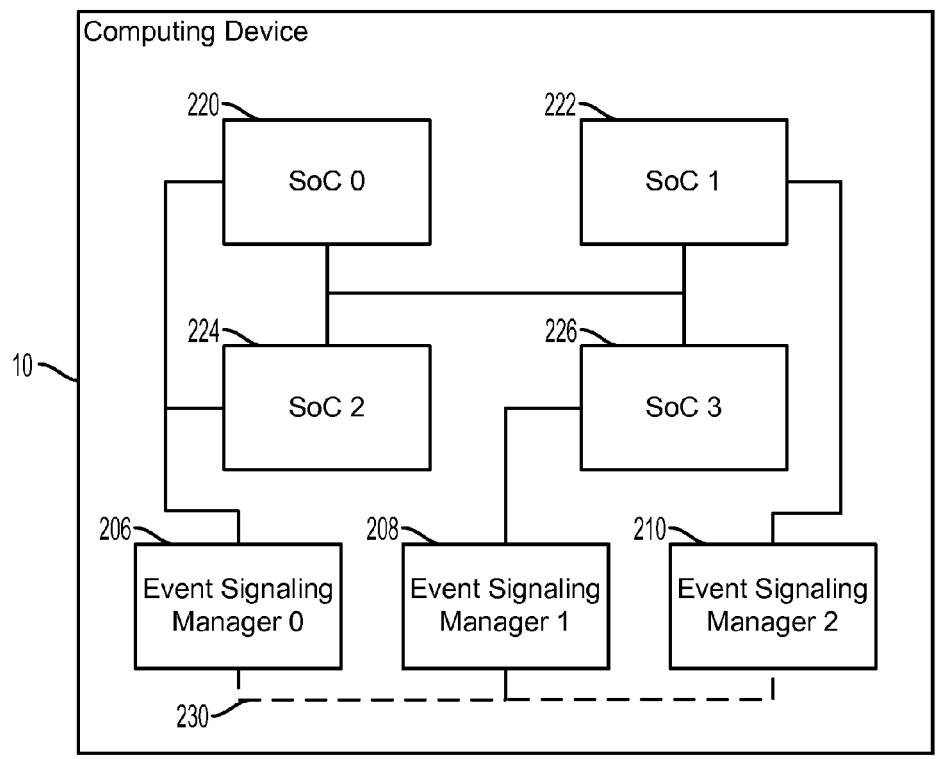

FIG. 2C illustrates an embodiment in which the signaling event managers 206, 208, 210 are local to the processor elements, like single or multi-core processor 221, 214, 216, 218. FIG. 2D illustrates an embodiment in which the signaling event managers 206, 208, 210 are local to the processing elements, like SoCs 220, 222, 224, 226. Similar to the example in FIG. 2B, the signaling event managers 206, 208, 210 may be in communication with each other via a common communication bus of the Soc 12 in FIG. 2C or the computing device 10 in FIG. 2D, or via a dedicated signaling event manager communication bus 230. In an embodiment, there may be layers of signaling event managers 206, 208, 210 such that the signaling event managers 206, 208, 210 may be local to the processor cores 200, 201, 202, 203 as in FIG. 2B and in communication with signaling event managers 206, 208, 210 local to higher level components, such as the multi-core processors 221, 214, 216, 218 or the SoCs 220, 222, 224, 226. Similarly, the signaling event managers 206, 208, 210 local to the multi-core processors 221, 214, 216, 218 may be in communication with the signaling event managers 206, 208, 210 local to SoCs 220, 222, 224, 226.

In the examples illustrated in FIGS. 2A and 2B, the multi-core processor 14 includes four processor cores 200, 201, 202, 203 (i.e., processor core 0, processor core 1, processor core 2, and processor core 3). The example illustrated in FIG. 2C, the SoC 12 includes four processors 212, 214, 216, 218 (i.e. processor 0, processor 1, processor 2, and processor 3). In the example illustrated in FIG. 2D, the computing device 10 includes four SoCs 220, 222, 224, 226 (i.e. SoC 0, SoC 1, SoC 2, and SoC 3). For ease of explanation, the various embodiments may be described with reference to any of the processor elements, including the four processor cores 200, 201, 202, 203, processors 212, 214, 216, 218, or SoCs 220, 222, 224, 226 illustrated in FIGS. 2A-2D. However, the processor elements illustrated in FIGS. 2 A-2D and referred to herein are provided merely as an example and in no way are meant to limit the various embodiments to a four-core processor system, a four processor system, or a four SoC system. The computing device 10, the SoC 12, or the multi-core processor 14 may individually or in combination include fewer or more than four processor cores, processor, or SoCs.

The multiple signaling event managers 206, 208, 210 may communicate with each other to manage the availability of resources requested by processing elements, the priorities of the processor elements, and signaling the processor elements to wake up and obtain a lock on the requested resource, as will be discussed further herein. The examples discussed herein may be explained in terms of a single signaling event manager; however this is only intended as an example and in no way meant to limit the various embodiments to a single signaling event manager system. The computing device 10, the SoC 12, or the multi-core processor 14 may individually or in combination include more than one signaling event manager.

Figure 3:
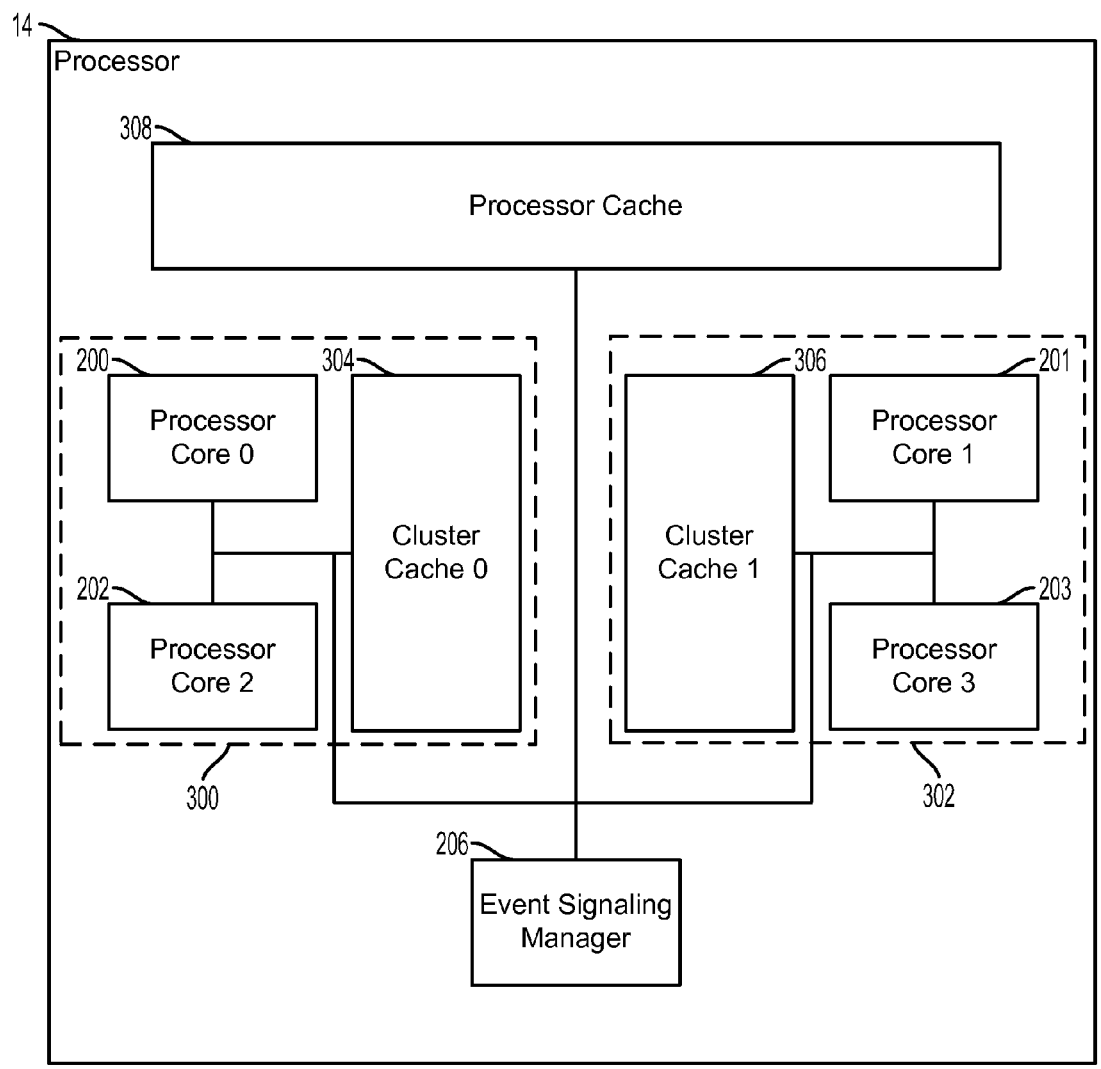
FIG. 3 is a component block illustrating an example multi-core processor having a cluster architecture and including an signaling event manager suitable for implementing an embodiment.

FIG. 3 illustrates an example processor element, such as a multi-core processor 14, employing a cluster architecture suitable for implementing an embodiment. Much like the example multi-core processor 14 in FIGS. 2A and 2B, the multi-core processor 14 illustrated in FIG. 3 may include four processor cores 200, 201, 202, 203, although this configuration of processor cores is not limiting and the various embodiments function in a similar manner with fewer or more processor cores. Also similar to the multi-core processor 14 in FIGS. 2A and 2B, the processor cores 200, 201, 202, 203 may all be in communication with the signaling event manager(s) 206, 208, 210, 212. The multi-core processor illustrated in FIG. 3 may further include grouping the processor cores 200, 201, 202, 203 into clusters 300, 302. The multi-core processor 14 may employ the clusters 300, 302 to efficiently execute processing of program instructions and data.

The clusters 300, 302 may be static, maintaining the same processor cores 200, 201, 202, 203 in the cluster 300, 302. The clusters 300, 302 may also be dynamic, changing the processor cores' membership in one or more cluster 300, 302 based on various factors. The example illustrated in FIG. 3 shows two processor cores 200, 201, 202, 203 in each cluster 300, 302. The number and combination of processor cores 200, 201, 202, 203 in the clusters 300, 302 are not meant to be limiting. Further, the number of clusters 300, 302 and configuration of each cluster 300, 302 is also not meant to be limiting. The clusters 300, 302 may include any combination of processor cores 200, 201, 202, 203, including processor cores 200, 201, 202, 203 included in both clusters 300, 302.

In addition to the processor cores 200, 201, 202, 203, the clusters 300, 302 may each include a cluster cache 304, 306, which, in an embodiment, may be configured much like the memory device 16 in FIG. 1 described above. The cluster cache 304, 306 may store data and program instructions for fast access by the processor cores 200, 201, 202, 203 in their respective clusters 300, 302. The cluster cache 304, 306 may store data related to prioritizing the processor cores 200, 201, 202, 203 for resource access request. In an embodiment, the items stored in the cluster cache 304, 306 may be relevant only to the respective cluster 300, 302 of the cluster cache 304, 306. The cluster cache 304, 306 may also store the resources for which the processor cores 200, 201, 202, 203 of the respective clusters 300, 302 issue resource access requests. The multi-core processor 14 may also include a processor cache 308 that may contain data and program instructions similar that in the cluster cache 304, 306. The processor cache 308 may maintain such information for one or more of the processor cores 200, 201, 202, 203 allocated to one or more of the clusters 300, 302.

The clusters 300, 302 may include processors cores 200, 201, 202, 203 capable of similar or disparate processing. The clusters 300, 302 may also include components, such as the processor cores 200, 201, 202, 203 and cluster caches 304, 306 of relatively close locality compared to other components of the multi-core processor 14 that may be options for inclusion in the clusters 300, 302. The clusters 300, 302 may be configured to more efficiently execute processes and threads than without clustering the processor cores 200, 201, 202, 203.

FIG. 4 illustrates an example table 400 demonstrating relationships between processor elements and their assigned priorities in accordance with an embodiment. The table 400 is an exemplary and non-limiting format for relating some or all of the data shown in table 400. The table 400 illustrates an example of how processor elements (listed in column 402) may be correlated (by rows) with information (columns 404-410) associated with the processor elements, although such data may be stored and related using any number of known data structures. Examples of information regarding each processor element may include a priority in column 404, one or more parameters for determining the priority in column 406 (e.g. processor element temperature, operating frequency, and/or proximity of/sharing of resources by the elements) a number of times the processor element has been signaled to wake up to obtain a resource lock in column 408, and an amount of time since the last occurrence of the processor element being signaled to wake up in column 410, or a time of the last occurrence of the processor element being signaled to wake up. In an embodiment, the parameters for determining the priority may be preprogrammed in software running on the computing device, hardcoded to the signaling event manager, or selected based on various considerations by the signaling event manager.

The table 400 may include all processor elements that make a lock resource access request. In an embodiment, during a particular session on the computing device, until a first processor element makes a lock resource access request, the table 400 may be empty or may not exist. The table 400 may be initiated upon a first lock resource access request by a first processor element. The table 400 may be further populated as other processor elements make other lock resource access requests.

In an embodiment the table 400 may include a row 414, 416, 418, 420, 422, 424 for relating the information of each processor element that makes a lock resource access request. A row 414-424 may be included in the table for each of N number processor elements (i.e. processor element 0 to processor element N−1). Each row 414-424 may be retained in the table 400 after the respective processor elements make an unlock resource access request. Each of the rows 414-424 make be updated upon the respective processor elements making another lock resource request, upon a processor element making an unlock resource access request, and/or at periodic intervals. In an embodiment, rows 414-424 for processor elements making unlock resource access request may be removed from the table 400. The table 400 may be a universal table for all lock resource access requests.

The table 400 may maintain information for each row 414-424 identifying the resource for which the associated processor element (listed in column 402) is attempting to obtain a lock. In such a table 400, it is possible for different processor elements to have the same priority (listed in column 404) as long as each priority relates to different resources.

In an embodiment, multiple tables 400 may be implemented in memory, in which case each of the tables 400 may be dedicated for a specific resource.

As an example of the relationship of various processor elements with their respective priorities, and other information relating to the processor elements that may be stored tables, table 400 illustrates how a criterion for determining priority according to a heuristic may be the processor element temperature 406. The example shows that the priority (listed in column 404) for each processor element may be determined based on an inverse relationship with the processor element temperature (listed in column 406). In this example, the lowest processor element temperature may correlate with the highest priority. Thus, processor element 2 in row 418, having the lowest processor element temperature of 28.1° C., may be assigned the highest priority of 1. Conversely, processor element 3 in row 420, having the highest processor element temperature of 38.2° C., may be assigned the highest priority of 8. As noted above, parameters other than the processor element temperature 406 may be used as the criterion for determining the priority 404 of the processor elements. In an embodiment, any combination of parameters may be used as criteria for determining priorities of processor elements.

In an embodiment, the number of times that the processor element has been signaled to wake up to obtain a resource lock (listed in column 408), and/or the amount of time since the last occurrence of the processor element being signaled to wake up (listed in column 410) may be used in a heuristic for setting priorities of processor elements in order to avoid a starvation condition for any of the processor elements. A starved processor element may be forced to wait so long that the process for which the starving processor element attempts to obtain the resource lock may not be progressing in a timely manner. Starvation may occur when a processor element is signaled to wake up significantly less often than other processor elements or waits significantly longer to be signaled to wake up than the other processor elements. The number of times that the processor element has been signaled to wake up to obtain a resource lock may be compared to a wake up number threshold. Additionally or alternatively, the amount of time since the last occurrence of the processor element being signaled to wake up may be compared to a time-since-wake up threshold. The comparison(s) may occur periodically and/or upon a processor element issuing an unlock resource access request. In response to determining that one or more of the starvation thresholds are exceeded, the priority of the starving processor element may be increased to enable the starving processor element to obtain the resource lock before other processor elements that previously had higher priority.

The table 400 may be stored in any of the above mentioned memory and storage devices. For example, the table 400 may be stored in the memory device 16 shown in FIG. 1, the processor cache 308 shown in FIG. 3, or in the signaling event manager 206 shown in FIGS. 2 and 3. In another example, the table 400 may be stored in the above mentioned memory device 16, the processor cache 308, the signaling event manager 206, the cluster cache 304, or the cluster cache 306 shown in FIG. 3. The signaling event manager may access the table 400 from any of these storage locations.

Figure 5:
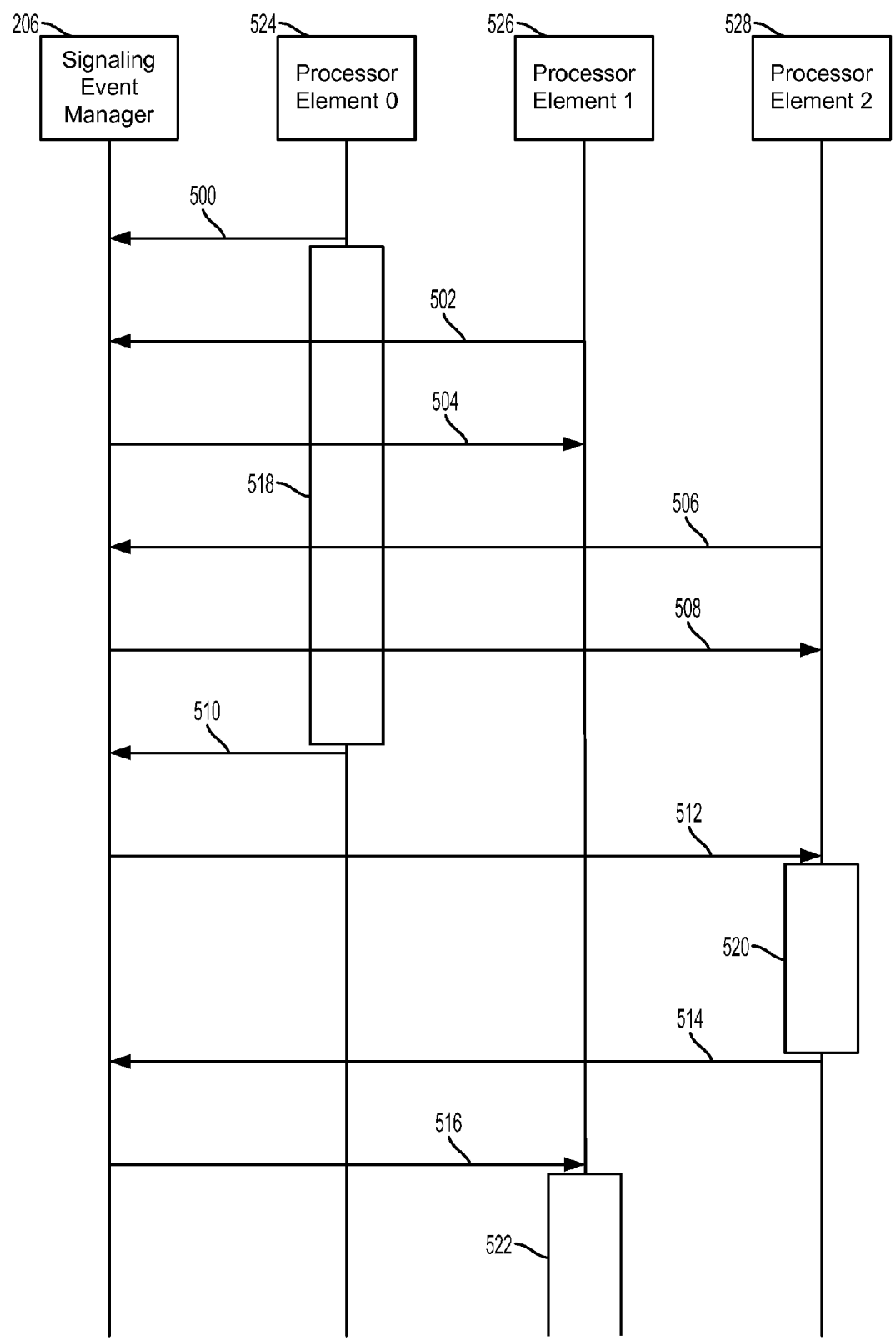
FIG. 5 is a processes flow and signaling diagram illustrating directed event signaling in a multiprocessor system in accordance with an embodiment.

FIG. 5 illustrates a process and signaling flows of directed event signaling in a multiprocessor system in accordance with an embodiment. For ease of explanation, the example in FIG. 5 includes signaling between the signaling event manager 206, processor element 0 524, processor element 1 526, and processor element 2 528. This example is not meant to be limiting regarding the number of processor elements that may communication with a signaling event manager, or the number of signaling event managers that may communicate with a processor element. In this example, processor element 0 524 may send a lock resource access request 500 to the signaling event manager 206. In response to no other processor element 526, 528 having a resource lock on the same resource for which processor element 0 524 is requesting the resource lock, the processor element 0 524 may obtain a resource lock 518. The signaling event manager 206 may respond to the lock resource access request 500, but it may not respond in some embodiments when the resource lock is available at the time of the lock resource access request 500.

The signaling event manager 206 may update or initiate a table for associating the processor elements 524, 526, 528 with respective priorities. In an embodiment, various schemes may be used to indicate the priority of a processor element that obtains a resource lock. For example, the processor element having the resource lock may be given the highest priority until it relinquishes the lock, at which point its priority may be updated based on the criterion for priority, whether the processor element issues another lock resource access request, and/or based on an opposite use of the starvation information. In other examples, the processor element having the resource lock may be assigned the lowest priority or no priority until making another lock resource access request.

When the processor element 1 526 sends a lock resource access request 502 to the signaling event manager 206 for the same resource locked by resource lock 518, the signaling event manager 206 may update the table and assign processor element 1 526 a priority for obtaining the requested resource lock. The signaling event manager 206 may return a wait-for-event signal 504 to the processor element 1 526 in response to the request resource being locked by the resource lock 518. The wait-for-event signal 504 may trigger the processor element 1 526 to enter a sleep state until it receives a signal that the resource is available for a resource lock (e.g. set event signal). However, the processor element 1 526 may not receive such a set event signal upon a first instance of the resource being available for a resource lock if it does not have the highest priority.

For the above lock resource access requests 500, 502 the information for the criterion of assigning priority may or may not be required by the signaling event manager 206. For the lock resource access request 500 the information may not be required as it is the first lock resource access request and no other processor elements 526, 528 are vying for the resource lock. The lock resource access request 502 may require the information, but it may not be necessary for assigning the priority for processor element 1 526 if it is the next processor element in line for the resource lock. However, the information may be stored in the table for comparison to subsequent lock resource access request as they may cause the signaling event manager 206 to alter the priority of processor element 1 526 in the future.

When processor element 2 528 sends a lock resource access request 506 to the signaling event manager 206 for the same resource as processor element 0 524 and processor element 1 526, the signaling event manager may update the table by comparing the information of the priority criterion for the processor element 2 528 with the information in the table for the other waiting processor elements, in this case processor element 1 526. In this example, processor element 2 528 has parameter values for the priority criterion that result in a higher priority than processor element 1. If the processor element 0 524 still has the resource lock 518, the signaling event manager may return a wait-for-event signal 508 to the processor element 2 528. The wait-for-event signal 508 may trigger the processor element 2 528 to enter a sleep state until it receives a signal that the resource is available for a resource lock (e.g. a set event signal).

Processor element 0 524 may send an unlock resource access request 510 to the signaling event manager 206, indicating that the processor element 0 524 is relinquishing the resource lock 518, making that resource available for another of the processor elements 526, 528 to obtain a resource lock on the resource. In response, the signaling event manager 206 may check the table to determine the processor element 524, 526, 528 that has the highest priority. In response to determining that processor element 2 528 has the highest priority, the signaling event manager 206 may send a set event signal, or a wake up signal 512 to that processor element 2 528. The wake up signal 512 may trigger the processor element 2 528 to wake up from its sleep state to obtain a resource lock 520. When it is finished with the resource, the processor element 2 528 may send an unlock resource access request 514 to the set signaling event manager 206 and relinquish the resource lock 520. In response, the signaling event manager 206 may again check the table to determine the processor element 524, 526, 528 with the highest priority. In the example illustrated in FIG. 5, at this point processor element 1 526 is the only processor element waiting for a resource lock, and therefore it is also the processor element 1 526 with the highest priority. Thus, the signaling event manager 206 may send a wake up signal 516 triggering processor element 1 526 to wake up from its sleep state and obtain a resource lock 522.

The lock resource access requests 500, 502, 506 may or may not include the information for the criterion for the priority and/or starvation. In an embodiment, the criterion for the priority and/or starvation may not be known to the processor elements 524, 526, 528. In this embodiment, the signaling event manager 206 may retrieve the information for the requesting processor elements 524, 526, 528 by requesting the information from another source, such as a kernel or operating system running on the computing device, retrieving the information from memory, or taking measurements from sensors (e.g., temperature sensors) near the processor elements 524, 526, 528. In other embodiments, the processor elements 524, 526, 528 may know the information, but may not know the information that is required by the signaling event manager 206, which may depend upon the particular heuristic that the signaling event manager has selected. Therefore, in response to receiving a lock resource access request 500, 502, 506, the signaling event manager 206 may send a request for the required information and receive the information from the lock requesting processor element in return. In an embodiment, the request for information by the signaling event manager 206 may be part of the wait-for-event signal 504, 508, and the signaling event manager 206 may receive the requested information prior to the processor elements 524, 526, 528 entering the sleep state. In an embodiment, the required information may be indicated in a special register, a memory location, or an added NOP instruction with special meaning before or after the wait-for-event signal 504, 508.

In an embodiment, rather than the signaling event manager 206 receiving unlock resource access requests 510, 514, and sending wake up signals 512, 516, the signaling event manager 206 may send updated priority information to the processor element that has the resource lock, and in response to relinquishing the resource lock, the relinquishing processor element may send a wake up signal to the processor element with the highest priority. In this manner, the highest priority processor element may receive the wake up signal from the relinquishing processor element, causing it to wake up from its sleep state and obtain a resource lock that is now available.

Figure 6:
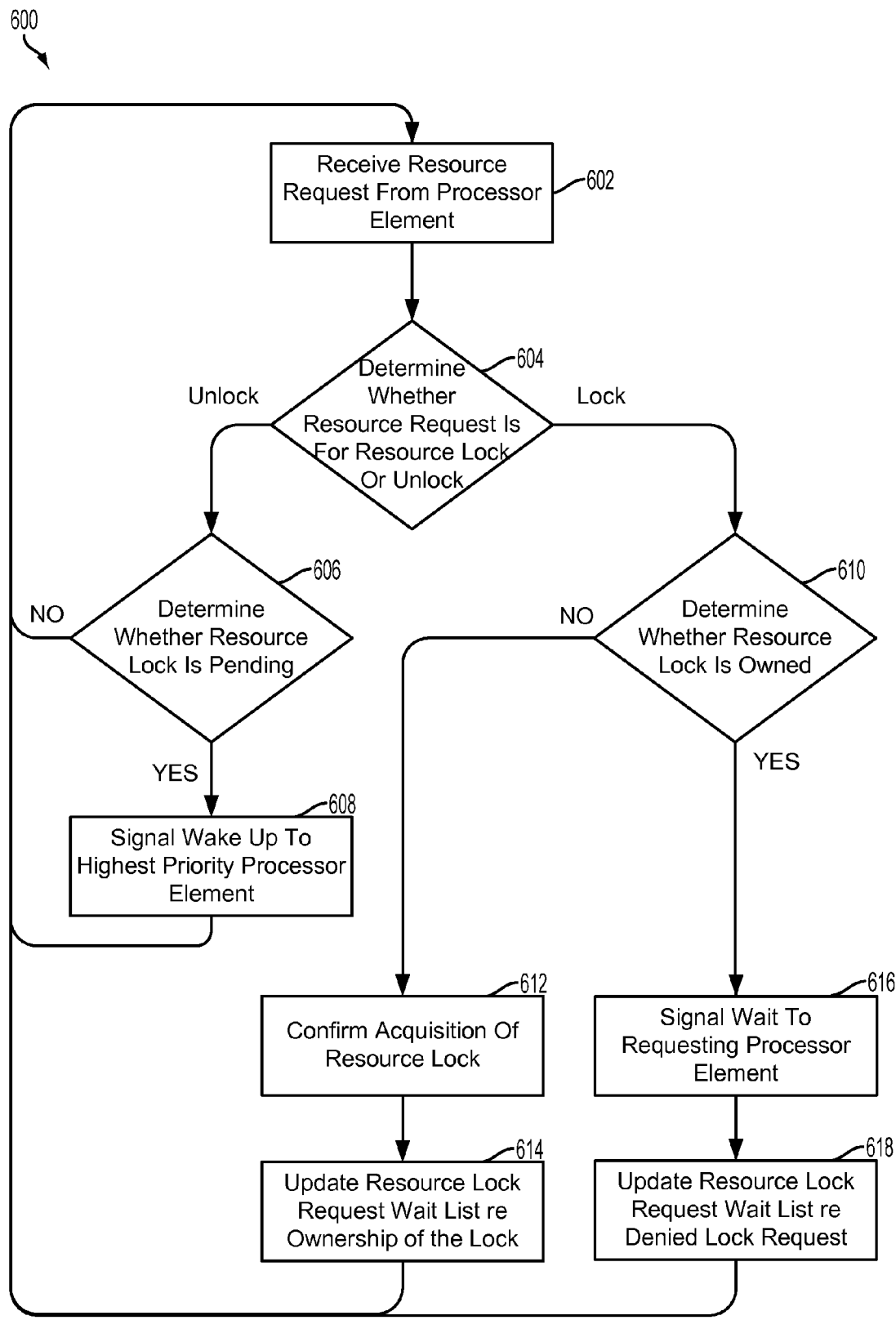
FIG. 6 is a process flow diagram illustrating an embodiment method for implementing illustrating directed event signaling in a multiprocessor system.

FIG. 6 illustrates an embodiment method 600 for implementing directed event signaling in a multiprocessor system. The method 600 may be executed in a computing device using software, general purpose or dedicated hardware, such as the processor or signaling event manager, or a combination of software and hardware. In block 602, the signaling event manager may receive a resource access request from a processor element. In an embodiment the resource access request may include information that may aid the signaling event manager to determine a priority of the requesting processor element to obtain a lock on the requested resource as discussed above.

In determination block 604, the signaling event manager may determine whether the resource access request is for unlocking an obtained resource lock or for obtaining a resource lock. For example, the resource access request may specify whether the request is an unlock resource access request or a lock resource access request. In response to determining that the resource access request is an unlock resource access request (i.e. determination block 604="Unlock"), the signaling event manager may determine whether there are any pending lock resource access requests for the same resource in determination block 606. In an embodiment, the signaling event manager may check the priorities of the processor elements that have previously sent lock resource access requests but were denied because the requested resource was already locked by another processor element. In response to determining that there are no pending lock resource access requests for the same resource (i.e. determination block 606="NO"), the signaling event manager may return to block 602 to receive other resource access requests. In response to determining that there are pending lock resource access requests, (i.e. determination block 606="YES"), the signaling event manager may send a wake up signal to the highest priority processor element in block 608, thereby triggering the processor element to wake up from a sleep state and obtain a lock on the available resource. The signaling event manager may receive other resource access requests in block 602.

In response to determining that the resource access request is a lock resource access request (i.e. determination block 604="Lock"), the signaling event manager may determine whether a lock on the requested resource is owned, or already obtained, by another processor element in determination block 610. As discussed above, the signaling event manager may store and maintain data regarding the lock and the processor elements that may be accessed for this operation, such as in a table. Such a table may be dedicated to particular resources and the signaling event manager may determine the status of an obtained resource lock by analyzing the data in the table. In an embodiment, the data in a table for a particular resource may indicate the status of a resource lock by the priority value. For example, a certain priority value may indicate that the associated processor element currently owns the resource lock. In another embodiment, data (e.g., a binary flag) may indicate ownership of a resource lock. Other embodiments include a universal table (rather than a resource specific table) that may include an indication of the resource(s) that the processor elements are requesting or own a resource lock. In response to determining, that the requested resource is not locked, the requested resource is available, or the resource lock is not owned (i.e. determination block 610="NO"), the signaling event manager may confirm acquisition of the resource lock to the requesting processor element in block 612. In block 614, the signaling event manager may update the table, or lock request wait list, to reflect the ownership of the resource lock. In the above described embodiment, the signaling event manager may accomplish updating the table by updating one or more of the indicators of resource lock ownership. The signaling event manager may receive other resource access requests in block 602.

In response to determining that the requested resource is locked/the requested resource is unavailable/the resource lock is owned (i.e. determination block 610="YES"), the signaling event manager may signal the requesting processor element to wait for an event in block 616. In an embodiment, the wait-for-event signal may trigger the processor element to enter a sleep more until being notified of the event as described above. In block 618, the signaling event manager may update the table, or lock request wait list, to reflect the denied request for the resource lock. In an embodiment, the signaling event manager may update at least the priority of the requesting processor element in the table, indicating that the requesting processor element has made a request for a resource lock, and where among the other requests of resource locks the current request ranks. The signaling event manager may receive other resource access requests in block 602.

Figure 7:
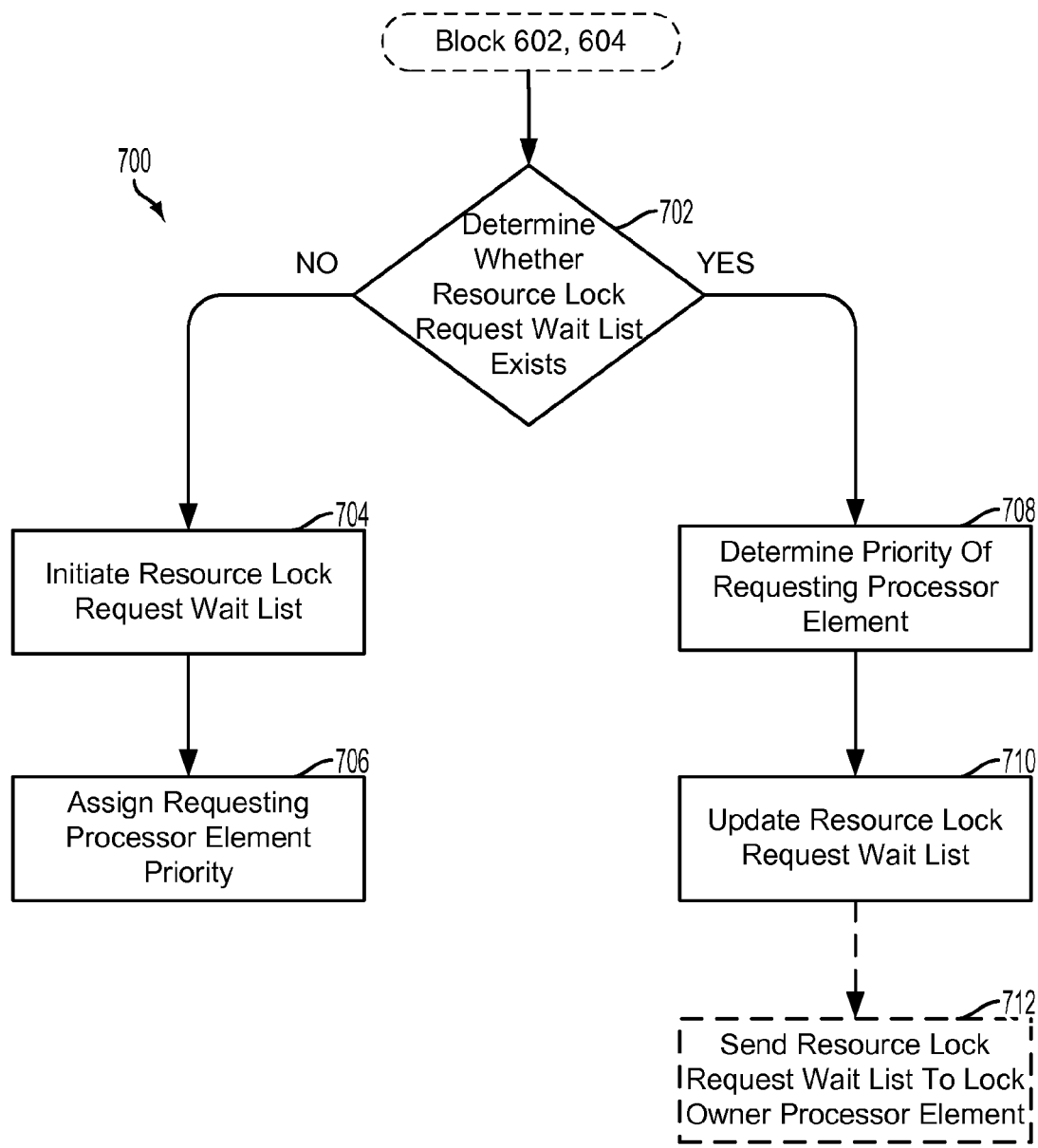
FIG. 7 is a process flow diagram illustrating an embodiment method for implementing a lock resource access request wait list for directed event signaling in a multiprocessor system.

In an embodiment, during a session on a computing device, the table may not yet be initiated, or fully or partially populated, prior to a first lock resource access request. A fully or partially populated table may include data, but the data may be irrelevant or incomplete before receiving updated data associated with lock resource access requests. To address this embodiment, the signaling event manager or another processor may implement an embodiment method 700 for determining whether such a table exists, and implementing a lock resource access request table, or wait list, when it does not exist as illustrated in FIG. 7. The method 700 may be executed in a computing device using software, general purpose or dedicated hardware, such as the processor or signaling event manager, or a combination of software and hardware.

When the signaling event manager has a need to access a lock resource access request or wait list table, such as upon receiving a resource request in block 602 or determining whether a requested resource is locked in determination block 604 in method 600, the signaling event manager may determine in determination block 702 whether a lock resource access request table, or wait list, exist, or is populated. In response to determining that the table is does not exist or is not initiated (i.e. determination block 702="NO"), the signaling event manager may initiate the table, or wait list in block 704. In an embodiment, initiating the table may involve creating and filling the table with data associated with at least one processor element making a lock resource access request. In block 706, the signaling event manager may assign the requesting processor element a priority. As described above, the first processor element of the table may have any priority since there are no other processor elements for comparison. In an embodiment, the first processor element in the table may be assigned a default priority or a random priority.

In response to determining that the table is does exist or is initiated (i.e. determination block 702="YES"), the signaling event manager may determine the priority of the requesting processor elements in block 708. As discussed above, the signaling event manager may receive the relevant data for determining the priority of a processor element by various means, including multiple signals between the signaling event manager and other hardware and software components of the computing device. The data that is relevant for determining the priority of a processor element may be predetermined by software or firmware, or may be selected by the signaling event manager. In block 710, the signaling event manager may update the table. Depending on the configuration of the table, the signaling event manager may update the priority of the requesting processor element, and the other processor elements listed in the table based on comparisons of the data associated with the requesting processor element with the data associated with the other processor elements. Updating the table to include or update the priority of the requesting processor element may cause changes to the priorities of the other processor elements in response to the priority of the requesting processor element being higher. In optional block 712, the signaling event manager may send the table to the processor element that owns the resource lock in embodiments in which the processor element owning the resource lock notifies the next waiting processor element when the resource is unlocked. The operations in optional block 712 enable the processor element owning the resource lock to determine the next waiting processor element that will receive the lock based on the priorities in the table.

Figure 8:
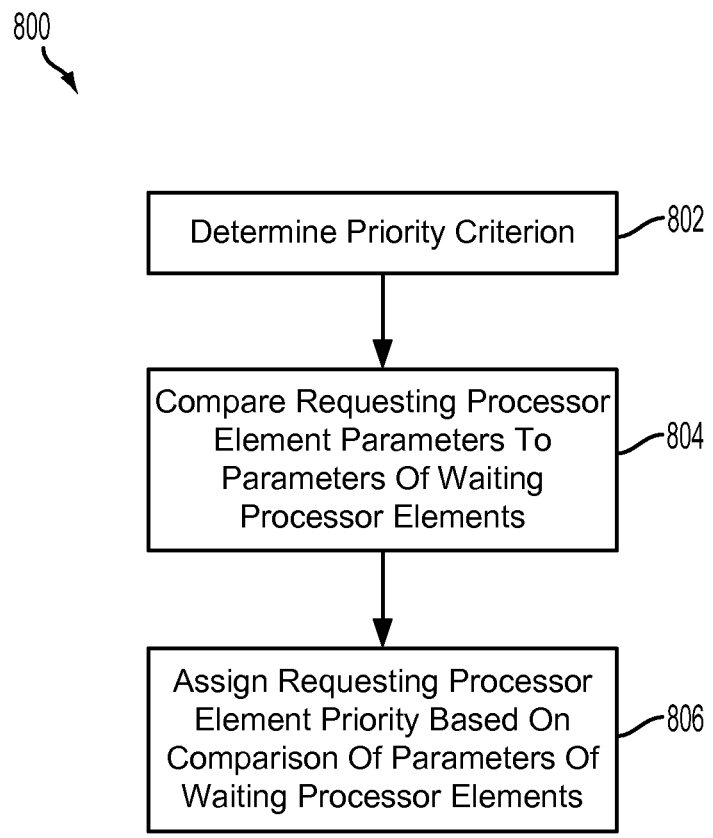
FIG. 8 is a process flow diagram illustrating an embodiment method for implementing prioritization of processor elements for directed event signaling in a multiprocessor system.

FIG. 8 illustrates an embodiment method 800 for implementing prioritization of processor elements for directed event signaling in a multiprocessor system. The method 800 may be executed in a computing device using software, general purpose or dedicated hardware, such as the processor or signaling event manager, or a combination of software and hardware. In block 802, the signaling event manager may determine the criterion or criteria for assigning priorities to the requesting processor elements. The criterion or criteria may include one or more of the processor element temperature, operating frequency, and locality. In an embodiment, the signaling event manager may select the criterion or criteria for assigning priorities, which may depend on the states of the computing device at the time. For example, states of high temperature, low power availability, power saving modes, and low priority processes may lead the signaling event manager to select low processor element temperature and/or low operating frequency as the criteria for higher priority. On the other hand, a fully charged or charging battery, and high performance software may lead the signaling event manager to select high operating frequency and/or high degree of locality as the criteria for higher priority. In other embodiments, the signaling event manager may determine the criterion or criteria for assigning priority by retrieving the criterion/criteria from storage, such as a register integrated in or external to the signaling event manager, or as provided by a software program running on the computing device.

In block 804, the signaling event manager may compare the one or more parameters of the requesting processor element related to the selected criterion to one or more similar parameters of the other processor elements stored in the table to determine the processing element that best satisfies the selected criterion or criteria for assigning priority. Depending on the selected criterion or criteria for determining the priorities of the processor elements, a favorable comparison for the requesting processor element may result from the data of the requesting processor element being higher or lower than that of the comparable data of the other processor elements. A favorable comparison for the requesting processor element may result in a higher priority than at least one of the other processor elements waiting to obtain a resource lock on the same resource as the requesting processor element. In some embodiments, the comparison in block 804 may be a direct comparison of the values of these parameters. In some embodiments, the comparison in block 804 may be an indirect comparison in which one or more algorithms/calculations are applied to the values of these parameters and the results of these algorithms/calculations are compared.

In block 806, the signaling event manager may assign a priority to the requesting processor element based on the parameter comparisons. Assigning the priority to the requesting processor element may also result in changes in priority for one or more of the other processor elements waiting to obtain a resource lock on the same resource. For example, in response to the requesting processor element being assigned a higher priority than three other processor elements, the priority of each of the three other processor elements may be decremented accordingly. At the same time, other processor elements having a higher priority than the priority assigned to the requesting processor element may remain unchanged by the priority assignment.

Figure 9:
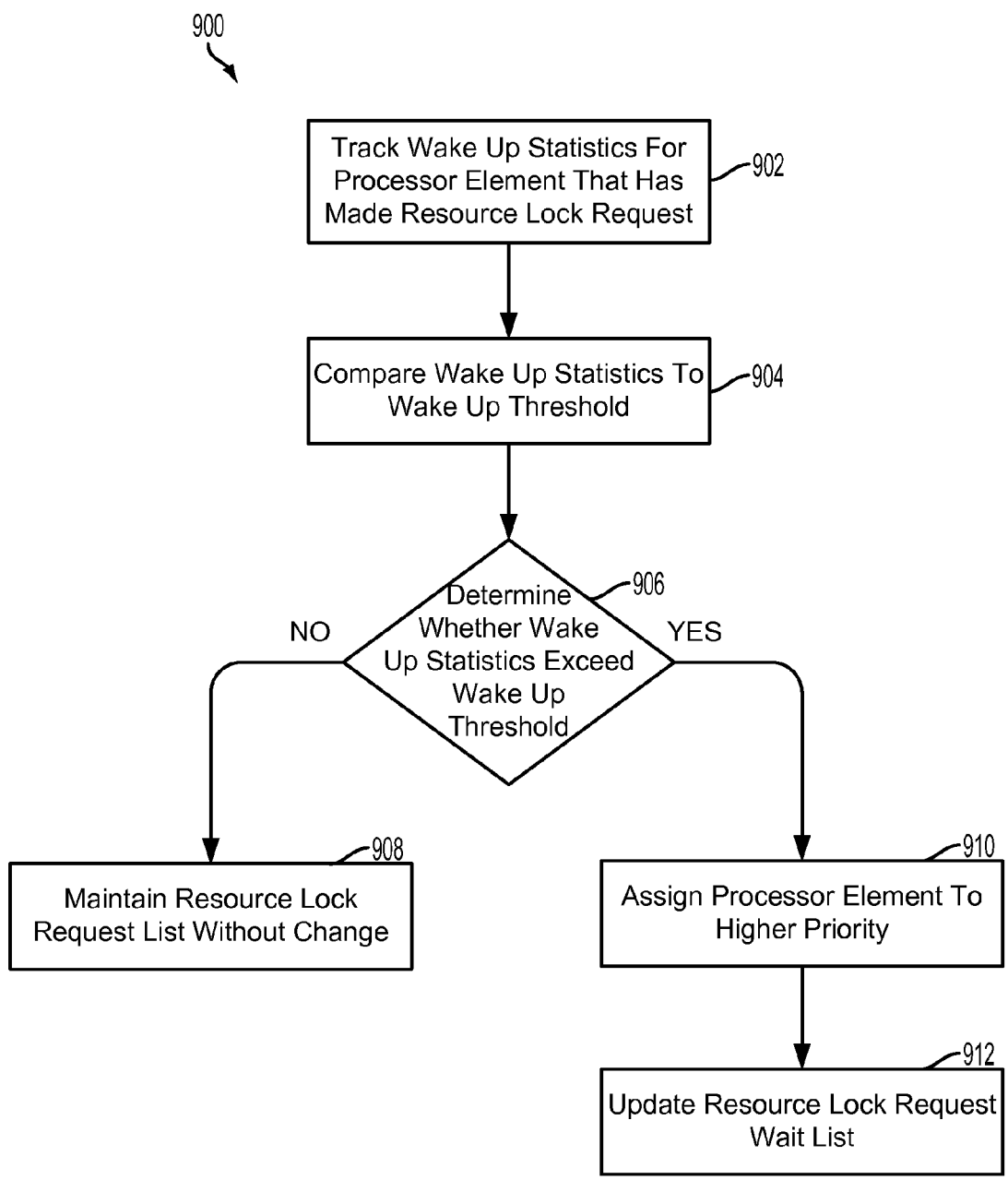
FIG. 9 is a process flow diagram illustrating an embodiment method for implementing starvation avoidance for directed event signaling in a multiprocessor system.

FIG. 9 illustrates an embodiment method 900 for implementing starvation avoidance for directed event signaling in a multiprocessor system. The method 900 may be executed in a computing device using software, general purpose or dedicated hardware, such as the processor or signaling event manager, or a combination of software and hardware. In block 902, the signaling event manager may track wake up statistics for one or more processor elements that have made a lock resource access request. In an embodiment, such wake up statistics may include the number of times the signaling event manager has sent a wake up signal to a processor element, the time at which the processor element was last sent a wake up signal, the elapsed time since the last wake up signal was sent to the processor element, the time at which the processor element made the pending lock resources access request, and/or the elapsed time since the processor element made the pending lock resources access request.

In block 904, the signaling event manager may compare the wake up statistics for a processor element with a pending lock resource access request to a wake up threshold. In an embodiment, the wake up threshold may be a predetermined value, a value based on historical information for the same statistic, or a function of one or more of the values of the same statistic for other processor elements with pending lock resource access requests.

In determination block 906, the signaling event manager may determine whether the wake up statistics of the processor element with the pending lock resource access request exceed the wake up threshold. In response to determining that the wake up statistics of the processor element with the pending lock resource access request do not exceed the wake up threshold (i.e. determination block 906="NO"), the signaling event manager may maintain the table without changes in block 908.

In response to determining that the wake up statistics of the processor element with the pending lock resource access request do exceed the wake up threshold (i.e. determination block 906="YES"), the signaling event manager may assign the processor element a higher priority in block 910, and update the table in block 912 as described for block 710 above. The higher priority assigned to the processor element may be determined numerous ways. In an embodiment, the higher priority may be assigned according to a predetermined rule, such as decrementing the priority by a certain value, assigning the processor element a constant priority (e.g., the highest priority), or inverting the position of the processor element in the priority queue. In an embodiment, the higher priority may be assigned according to a severity of starvation of the processor element. The severity may be determined by a function of the wake up statistics of the processor element as compared to the wake up statistics of the other processor elements. The greater the severity of starvation, the higher the priority that may be assigned to the processor element.

Figure 10:
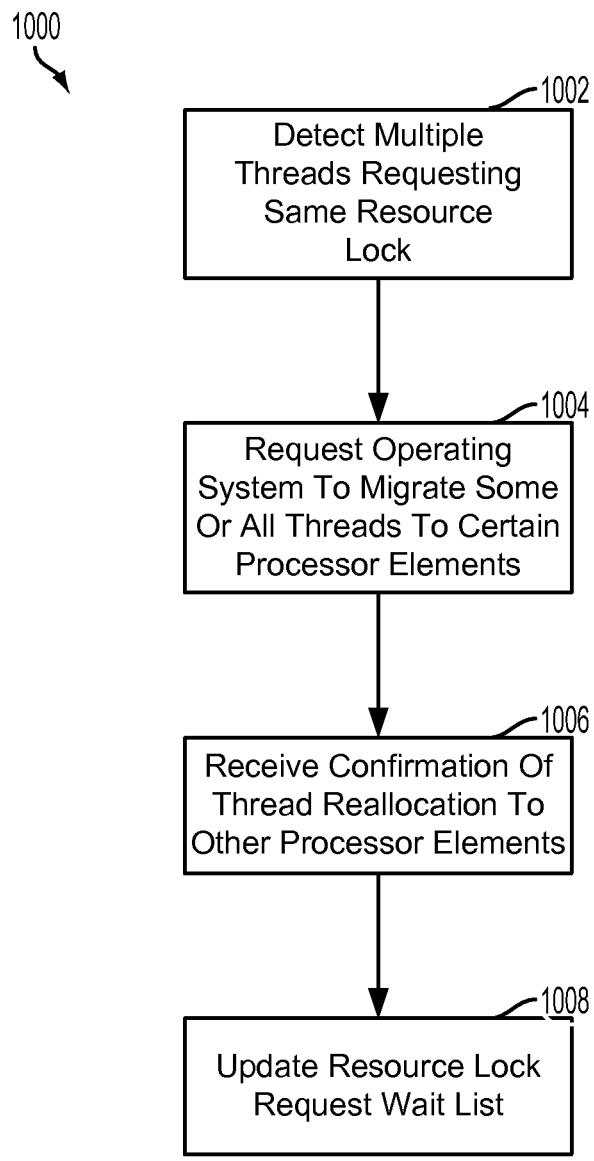
FIG. 10 is a process flow diagram illustrating an embodiment method for implementing lock aware scheduling with directed event signaling in a multiprocessor system.

FIG. 10 illustrates an embodiment method 1000 for implementing lock aware scheduling with directed event signaling in a multiprocessor system. The method 1000 may be executed in a computing device using software, general purpose or dedicated hardware, such as the processor or signaling event manager, or a combination of software and hardware. In block 1002, the signaling event manager may detect that multiple threads are requesting the same resource lock, such as when multiple threads use common resources to execute on different processor elements.

In block 1004, the signaling event manager may request the operating system/scheduler to migrate some or all of the threads contending for the same resource to certain processor elements. The signaling event manager may request migrating the threads to certain elements to take advantage of certain efficiencies of different system architectures. In an embodiment, the processor elements may be arranged in a cluster architecture. Selecting certain processors elements of a cluster to execute threads contending for the same resource may maximize performance when the processor elements of the cluster are operating at the same frequency. In an embodiment, processor elements of a cluster tend to be in close proximity. Thermal dissipation may be improved when waiting processor elements of the cluster can be stalled with almost zero power consumption, and the area of the stalled processor elements can be used to dissipate the heat generated by other running processor elements. In an embodiment, the maximum frequency of the running processor elements may exceed the maximum recommended temperature and/or operating frequency when the extra area of the stalled processor elements is used for thermal dissipation. In an embodiment, processor architectures may employ shared portions of memory hierarchy by multiple processor elements, in which case access latency to the memory may be reduced or minimized as priority criteria, and locality increased or maximized as priority criteria in various heuristics. In computing systems that include multiple power sources, priority criteria may be adjusted so that threads may be moved to processor elements using the same power sources while processor elements on other power sources may be reduced in priority so they may not receive threads and therefore powered off. In block 1006, the signaling event manager may receive confirmation of the reallocation of the threads contesting for the same resources are reallocated to the requested processor elements. In block 1008, the signaling event manager may update the table as described above for block 710.

Figure 11:
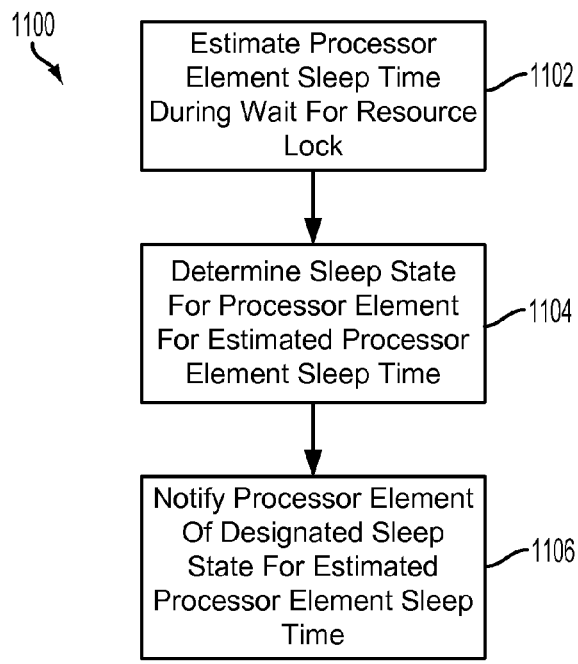
FIG. 11 is a process flow diagram illustrating an embodiment method for implementing lock stall actions with directed event signaling in a multiprocessor system.

FIG. 11 illustrates an embodiment method 1100 for implementing lock stall actions with directed event signaling in a multiprocessor system. The method 1100 may be executed in a computing device using software, general purpose or dedicated hardware, such as the processor or signaling event manager, or a combination of software and hardware. In block 1102, the signaling event manager may estimate the sleep time for a processor element (i.e., the duration that the processor may remain in a low-power state) while in a current wait-for-event state waiting for a requested resource lock to become available. In an embodiment, the signaling event manager may make the estimate based on one or more of historical information, expected execution times for threads on processor elements waiting for the same resource with higher priorities, and the number of higher priority processor elements waiting for the resource. For example, if the processor element has low priority and there are multiple processor elements with higher priority waiting for the same resource, the signaling event manager may estimate that the processing element will have a relatively long sleep time, especially compared to when the processor element has the highest priority or is the only element on the waiting list and thus is next in line to use the resource.

In block 1104, the signaling event manager may determine a sleep state for the requesting processor element based on the estimated sleep time. Various embodiments may implement numerous different sleep states for the processor elements. Different sleep states may be characterized by the level of power consumption. Higher power consumption sleep states may provide less power savings but be capable of waking up faster, such as by retain state and working data in volatile memory. In contrast, lower power consumption sleep states may save more power by turning off more resources and powering down memory, resulting in the need to reenergize more resources (which requires power) and reload state data into volatile memory (which takes more time) in order to ramp up to executing instructions. In an embodiment, the signaling event manager may select higher power consumption sleep states for shorter estimated sleep times because the power savings over a shorter period of time may not be worth the loss in efficiency due to having to reestablish the processor element within the system. Similarly, for longer sleep times the signaling event manager may select lower power consumption sleep states because of the net benefit of the greater power savings. In block 1106, the signaling event manager may notify the requesting processor element of the designated sleep state for the estimated sleep time. In an embodiment, the requesting processor element may implement the designated sleep state.

Figure 12:
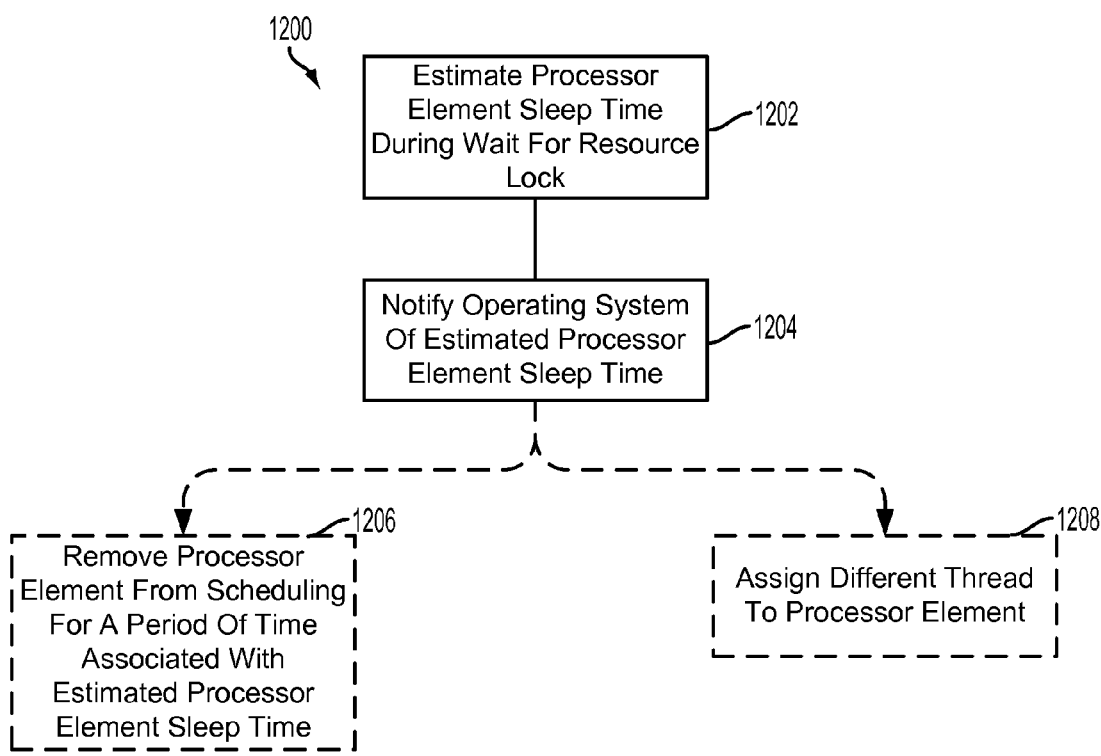
FIG. 12 is a process flow diagram illustrating an embodiment method for implementing lock stall actions with directed event signaling in a multiprocessor system.

FIG. 12 illustrates an embodiment method 1200 for implementing lock stall actions with directed event signaling in a multiprocessor system. The method 1200 may be executed in a computing device using software, general purpose or dedicated hardware, such as the processor or signaling event manager, or a combination of software and hardware. In block 1202, the signaling event manager may estimate the sleep time for a processor element (i.e., the duration that the processor may remain in a low-power state) while in a current wait-for-event state waiting for a requested resource lock to become available as in block 1102. In block 1204, the signaling event manager may notify the operating system/scheduler of the estimated sleep time. In an embodiment, in optional block 1206, the operating system/scheduler may remove the requesting processor element from a scheduling queue for a period of time associated with the estimated sleep time. In an alternative embodiment, in optional block 1208, the operating system/scheduler may assign a different thread to the processor element during the estimated sleep time, such as a thread that will not require use of the resource for which the processor element received a wait-for-event signal.

Figure 13:
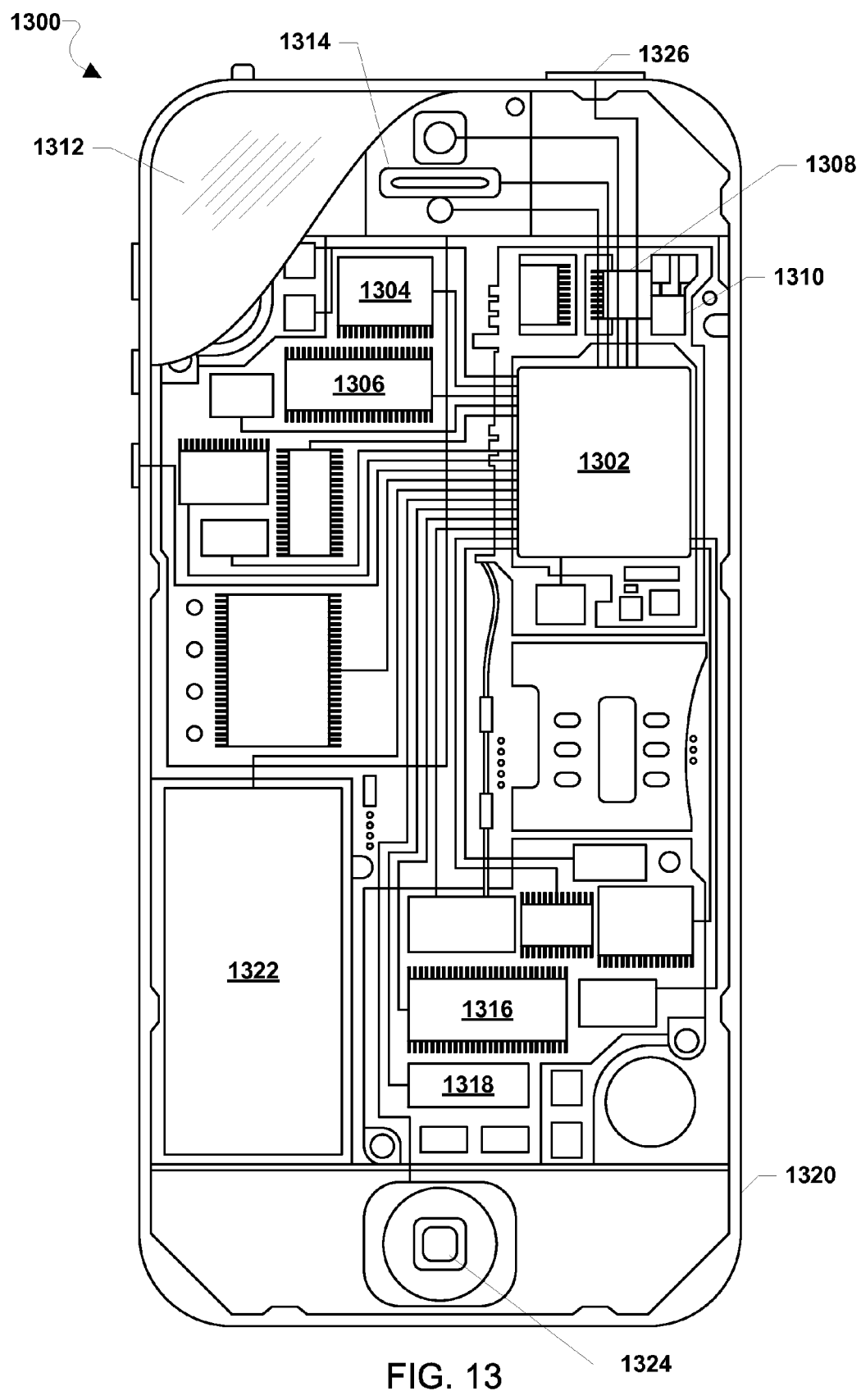
FIG. 13 is component block diagram illustrating an example mobile computing device suitable for use with the various embodiments.

FIG. 13 illustrates an example mobile computing device suitable for use with the various embodiments, for instance, embodiments shown in and/or described with reference to FIGS. 1-12. The mobile computing device 1300 may include a processor 1302 coupled to a touchscreen controller 1304 and an internal memory 1306. The processor 1302 may be one or more multi-core integrated circuits designated for general or specific processing tasks. The internal memory 1306 may be volatile or non-volatile memory, and may also be secure and/or encrypted memory, or unsecure and/or unencrypted memory, or any combination thereof. Examples of memory types which can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 1304 and the processor 1302 may also be coupled to a touchscreen panel 1312, such as a resistive-sensing touchscreen, capacitive-sensing touchscreen, infrared sensing touchscreen, etc. Additionally, the display of the computing device 1300 need not have touch screen capability.

The mobile computing device 1300 may have one or more radio signal transceivers 1308 (e.g., Peanut, Bluetooth, Zigbee, Wi-Fi, RF radio) and antennae 1310, for sending and receiving communications, coupled to each other and/or to the processor 1302. The transceivers 1308 and antennae 1310 may be used with the above-mentioned circuitry to implement the various wireless transmission protocol stacks and interfaces. The mobile computing device 1300 may include a cellular network wireless modem chip 1316 that enables communication via a cellular network and is coupled to the processor.

The mobile computing device 1300 may include a peripheral device connection interface 1318 coupled to the processor 1302. The peripheral device connection interface 1318 may be singularly configured to accept one type of connection, or may be configured to accept various types of physical and communication connections, common or proprietary, such as USB, FireWire, Thunderbolt, or PCIe. The peripheral device connection interface 1318 may also be coupled to a similarly configured peripheral device connection port (not shown).

The mobile computing device 1300 may also include speakers 1314 for providing audio outputs. The mobile computing device 1300 may also include a housing 1320, constructed of a plastic, metal, or a combination of materials, for containing all or some of the components discussed herein. The mobile computing device 1300 may include a power source 1322 coupled to the processor 1302, such as a disposable or rechargeable battery. The rechargeable battery may also be coupled to the peripheral device connection port to receive a charging current from a source external to the mobile computing device 1300. The mobile computing device 1300 may also include a physical button 1324 for receiving user inputs. The mobile computing device 1300 may also include a power button 1326 for turning the mobile computing device 1300 on and off.

Figure 14:
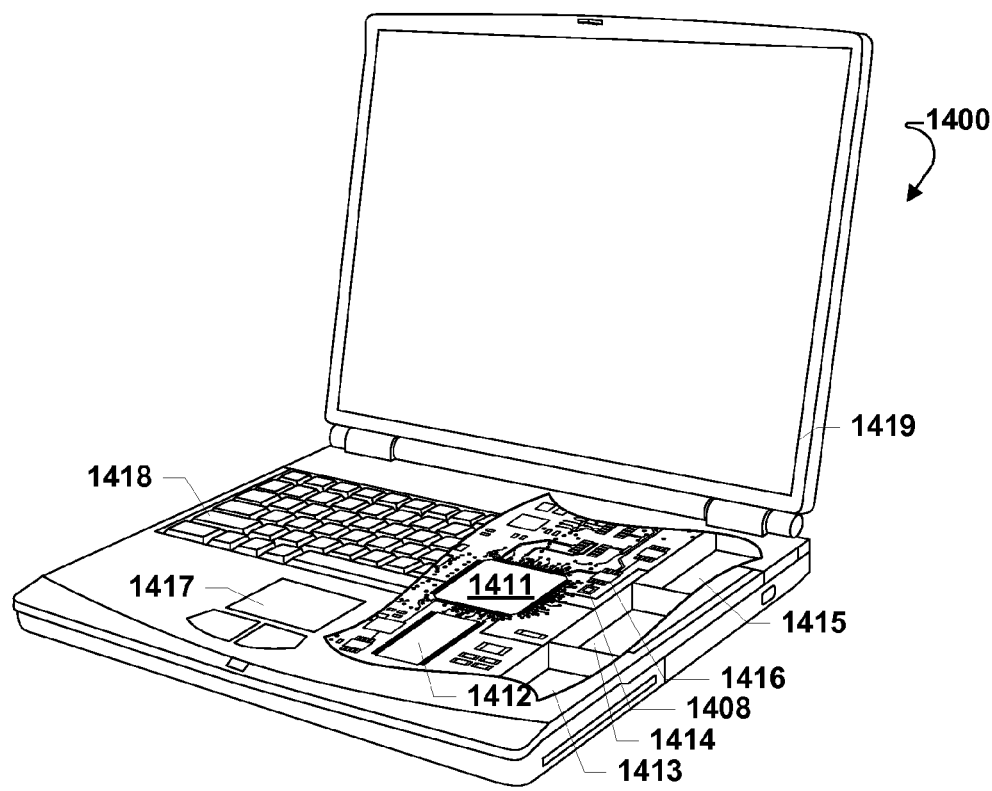
FIG. 14 is component block diagram illustrating an example mobile computing device suitable for use with the various embodiments.

The various embodiments, for instance, embodiments shown in and/or described with reference to FIGS. 1-12, may also be implemented within a variety of mobile computing devices, such as a laptop computer 1400 illustrated in FIG. 14. Many laptop computers include a touchpad touch surface 1417 that serves as the computer's pointing device, and thus may receive drag, scroll, and flick gestures similar to those implemented on computing devices equipped with a touch screen display and described above. A laptop computer 1400 will typically include a processor 1411 coupled to volatile memory 1412 and a large capacity nonvolatile memory, such as a disk drive 1413 of Flash memory. Additionally, the computer 1400 may have one or more antenna 1408 for sending and receiving electromagnetic radiation that may be connected to a wireless data link and/or cellular telephone transceiver 1416 coupled to the processor 1411. The computer 1400 may also include a floppy disc drive 1414 and a compact disc (CD) drive 1415 coupled to the processor 1411. In a notebook configuration, the computer housing includes the touchpad 1417, the keyboard 1418, and the display 1419 all coupled to the processor 1411. Other configurations of the computing device may include a computer mouse or trackball coupled to the processor (e.g., via a USB input) as are well known, which may also be used in conjunction with the various embodiments.

Figure 15:
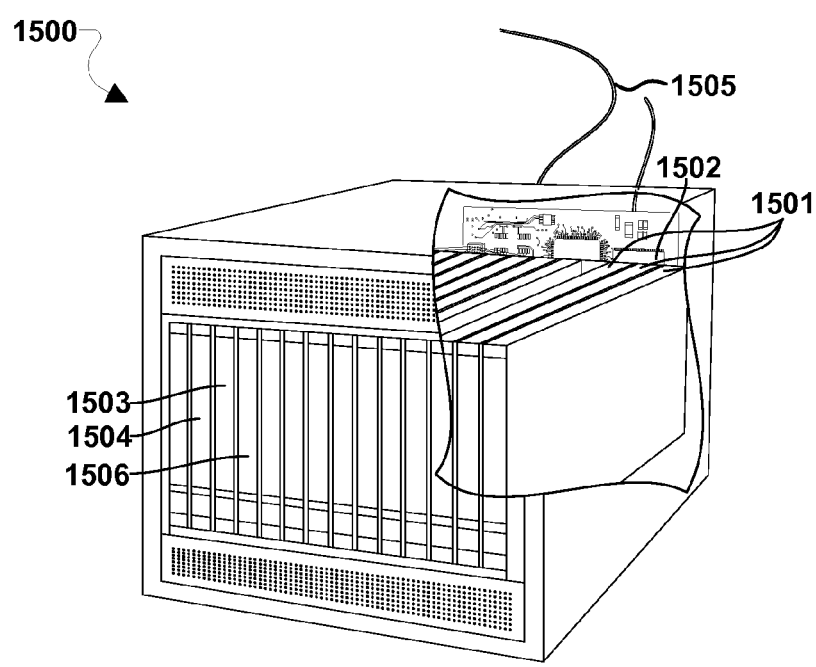
FIG. 15 is component block diagram illustrating an example server suitable for use with the various embodiments.

The various embodiments, for instance, embodiments shown in and/or described with reference to FIGS. 1-12, may also be implemented in any of a variety of commercially available servers for compressing data in server cache memory. An example server 1500 is illustrated in FIG. 15. Such a server 1500 typically includes one or more multi-core processor assemblies 1501 coupled to volatile memory 1502 and a large capacity nonvolatile memory, such as a disk drive 1504. As illustrated in FIG. 15, multi-core processor assemblies 1501 may be added to the server 1500 by inserting them into the racks of the assembly. The server 1500 may also include a floppy disc drive, compact disc (CD) or DVD disc drive 1506 coupled to the processor 1501. The server 1500 may also include network access ports 1503 coupled to the multi-core processor assemblies 1501 for establishing network interface connections with a network 1505, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many computing devices operating system kernels are organized into a user space (where non-privileged code runs) and a kernel space (where privileged code runs). This separation is of particular importance in Android and other general public license (GPL) environments in which code that is part of the kernel space must be GPL licensed, while code running in the user-space may not be GPL licensed. It should be understood that at least some of the various software components/modules discussed here may be implemented in either the kernel space or the user space, unless expressly stated otherwise.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for managing processor elements contending for one or more common resources on a computing device having a plurality of processor elements, comprising:
   determining a parameter for use in assigning priorities to the plurality of processor elements requesting access to a resource based on an operating state of the computing device;
   assigning a priority to a processor element for requesting access to the resource, wherein the priority is assigned based on the parameter for the processing element;
   signaling the processor element requesting access to the resource to wait for the resource to become available in response to determining that the resource is not available; and
   signaling the processor element to access the resource in response to determining that the resource is available and that the processor element is assigned a highest priority for requesting access to the resource.

2. The method of claim 1, further comprising:
   receiving a signal indicating availability of the resource; and
   identifying one of the plurality of processor elements that is assigned the highest priority for accessing the resource in response to the signal indicating availability of the resource.

3. The method of claim 1, wherein:
   signaling the processor element requesting access to the resource to wait for the resource to become available in response to determining that the resource is not available comprises triggering the processor element to enter a sleep state; and
   signaling the processor element to access the resource comprises signaling the processor element to wake up.

4. A computing device , comprising:
   a plurality of processor elements; and
   a signaling event manager communicatively connected to the plurality of processor elements and configured with signaling event manager-executable instructions to perform operations comprising:
      determining a parameter for use in assigning priorities to the plurality of processor elements requesting access to a resource based on an operating state of the computing device:
      assigning a priority to a processor element for requesting access to the resource, wherein the priority is assigned based on the parameter for the processing element;
      signaling the processor element requesting access to the resource to wait for the resource to become available in response to determining that the resource is not available; and
      signaling the processor element to access the resource in response to determining that the resource is available and that the processor element is assigned a highest priority for requesting access to the resource.

5. The computing device of claim 4, wherein the signaling event manager is further configured with signaling event manager-executable instructions to perform operations further comprising:
   receiving a signal indicating availability of the resource; and
   identifying one of the plurality of processor elements that is assigned the highest priority for accessing the resource in response to the signal indicating availability of the resource.

6. The computing device of claim 4, wherein the signaling event manager is further configured with signaling event manager-executable instructions to perform operations such that:
   signaling the processor element requesting access to the resource to wait for the resource to become available in response to determining that the resource is not available comprises triggering the processor element to enter a sleep state; and
   signaling the processor element to access the resource comprises signaling the processor element to wake up.

7. A non-transitory processor-readable medium having stored thereon processor-executable software instructions to cause a processor of a computing device having a plurality of processing elements to perform operations comprising:
   determining a parameter for use in assigning priorities to the plurality of processor elements requesting access to a resource based on an operating state of the computing device;

assigning a priority to a processor element for requesting access to the resource, wherein the priority is assigned based on the parameter for the processing element;

signaling the processor element requesting access to the resource to wait for the resource to become available in response to determining that the resource is not available; and signaling the processor element to access the resource in response to determining that the resource is available and that the processor element is assigned a highest priority for requesting access to the resource.

8. The non-transitory processor-readable medium of claim 7, wherein the stored processor-executable software instructions are configured to cause the processor to perform operations further comprising:

receiving a signal indicating availability of the resource; and identifying one of the plurality of processor elements that is assigned the highest priority for accessing the resource in response to the signal indicating availability of the resource.

9. The non-transitory processor-readable medium of claim 7, wherein the stored processor-executable software instructions are configured to cause the processor to perform operations such that:

signaling the processor element requesting access to the resource to wait for the resource to become available in response to determining that the resource is not available comprises triggering the processor element to enter a sleep state; and signaling the processor element to access the resource comprises signaling the processor element to wake up.

10. A computing device having a plurality of processor elements, comprising:

means for determining a parameter for use in assigning priorities to the plurality of processor elements requesting access to a resource based on an operating state of the computing device:

means for assigning a priority to a processor element for requesting access to the resource, wherein the priority is assigned based on the parameter for the processing element;

means for signaling the processor element requesting access to the resource to wait for the resource to become available in response to determining that the resource is not available; and means for signaling the processor element to access the resource in response to determining that the resource is available and that the processor element is assigned a highest priority for requesting access to the resource.

11. The computing device of claim 10, further comprising:

means for receiving a signal indicating availability of the resource; and means for identifying one of the plurality of processor elements that is assigned the highest priority for accessing the resource in response to the signal indicating availability of the resource.

12. The computing device of claim 10, wherein:

means for signaling the processor element requesting access to the resource to wait for the resource to become available in response to determining that the resource is not available comprises means for triggering the processor element to enter a sleep state; and means for signaling the processor element to access the resource comprises means for signaling the processor element to wake up.

* * * * *